United States Patent [19]

Swett

[11] Patent Number: 5,101,200

[45] Date of Patent: Mar. 31, 1992

[54] FAST LANE CREDIT CARD

[76] Inventor: Paul H. Swett, P.O. Box 71, Round Pond, Me. 04564

[21] Appl. No.: 364,350

[22] Filed: Jun. 9, 1989

[51] Int. Cl.⁵ .................. G08G 1/017; G08G 1/054
[52] U.S. Cl. .................. 340/937; 340/928; 340/933; 340/942; 358/108; 235/437; 235/454; 364/456; 364/464.01
[58] Field of Search .............. 340/937, 928, 942, 933; 364/456, 464.01; 358/108, 110, 113, 125; 235/375, 437, 454, 462

[56] References Cited

U.S. PATENT DOCUMENTS

| | | |
|---|---|---|
| 3,109,157 | 10/1963 | Bolton . |
| 3,575,586 | 4/1971 | Kroll . |
| 3,690,233 | 9/1972 | Billingsley ..................... 340/937 |
| 3,701,102 | 10/1972 | Berman et al. . |
| 3,705,976 | 12/1972 | Platzman . |
| 3,794,966 | 2/1974 | Platzman . |
| 4,072,930 | 2/1978 | Lucero et al. ................ 340/323 R |
| 4,303,904 | 12/1981 | Chasek ...................... 340/825.54 |
| 4,398,172 | 8/1983 | Carroll et al. ................ 340/942 |
| 4,517,563 | 5/1985 | Diamant ..................... 340/825.54 |
| 4,626,847 | 12/1986 | Zato .......................... 340/825.56 |
| 4,628,309 | 12/1986 | Allias ........................ 340/825.54 |
| 4,675,824 | 6/1987 | Kiyama et al. . |

OTHER PUBLICATIONS

Apr. 21, 1989, Marcia McAllister, "Budget Choices: People or Roads", The Fairfax Journal.
Dec. 29, 1988, Steve Bates, "Private Firm to Bid for Dulles Toll Road", The Washington Post.
1989, WETA, "Traffic Jam! Survey Results".
Apr. 24, 1989, Len Boselovic, "Panel Gets a Litany of Road Woes", Fairfax Journal.
Jun. 8, 1978, Gearty, "Turnpike Decomposes in Woods", Virginia-Reston Times.
Apr. 28, 1989, Alan Fogg, "Legislators Push Regional Transit Panel", The Fairfax Journal.
Feb. 1981, Albert H. Nuttall, "Some Windows with Very Good Sidelobe Behavior", IEEE Transactions on Acoustics, Speech, and Signal Processing, vol. ASSP-29, No. 1.
Mar. 17, 1989, Len Boselovic, "Wilson Bridge Might Toll for Thee", Fairfax Journal.
Jan. 1978, Fredric Harris, "On the Use of Windows for Harmonic Analysis with the Discreet Fourier Transform", Proceedings of the IEEE, vol. 66, No. 1, pp. 51-83.

Primary Examiner—Donnie L. Crosland
Attorney, Agent, or Firm—David B. Newman, Jr.

[57] ABSTRACT

A toll paying system for use with a vehicle passing through a fast lane, having a toll booth. The toll paying system comprises detection means, class determining means, a wallboard, and a vehicle having both a first processor and a transmitter; a toll booth having antenna means, a receiver, a second processor, and camera means. The detection means may be embodied as a plurality of light beams traversing the fast lane with a plurality of light beam detectors. The light beam detectors generate a detection signal in response to a vehicle crossing the light beams. In general, the detection means generates a detection signal in response to detecting the presence of the vehicle in the fast lane. The class determining means may be embodied as an apparatus which determines the class of vehicle passing through the fast lane. The class of vehicle may be a car, truck, or any other type of class desirable for classifying vehicles passing through the toll paying system. The wallboard displays a message including tag information, in response to receiving the detection signal from the detection means.

6 Claims, 9 Drawing Sheets

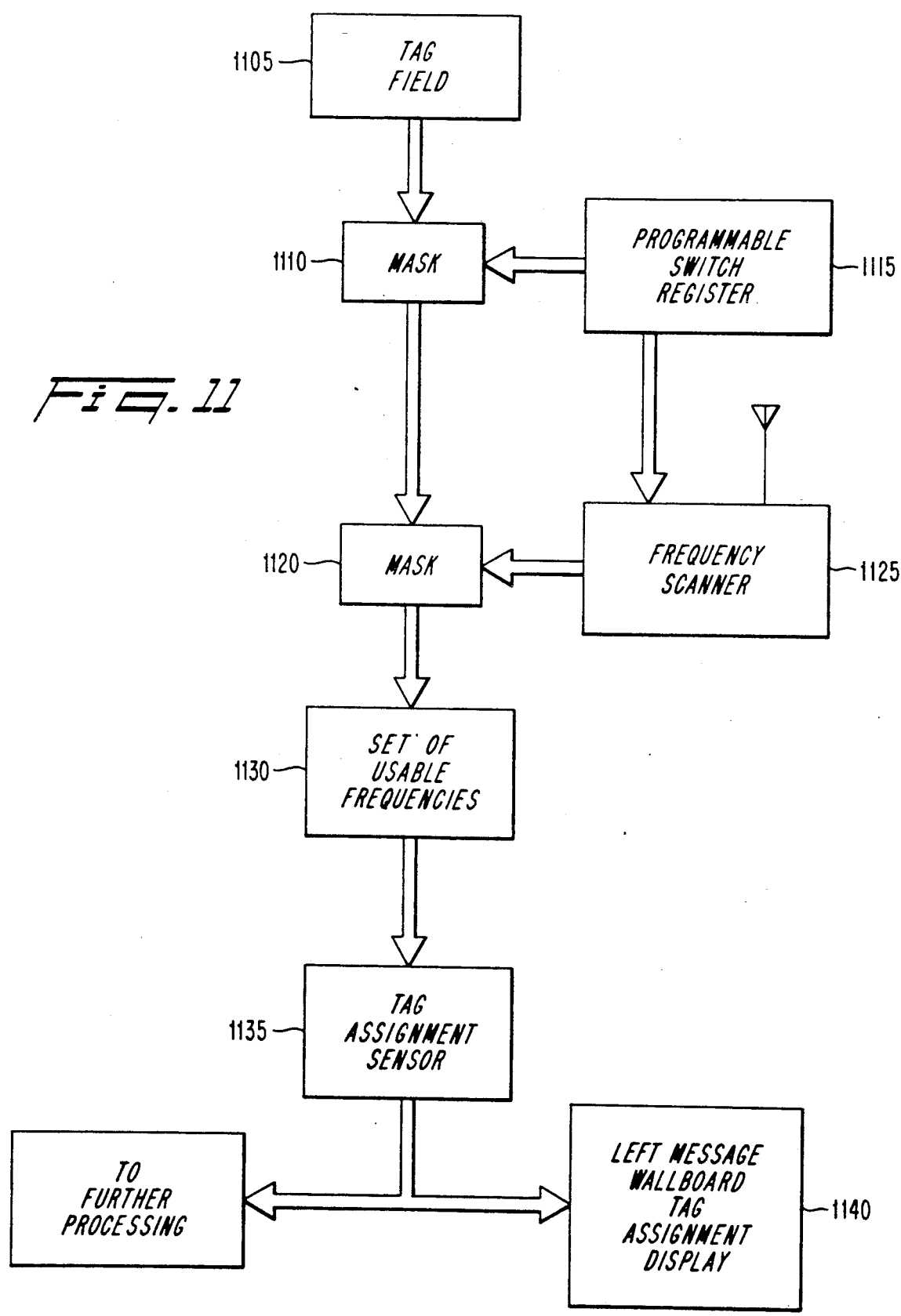

FAST LANE CREDIT CARD

BACKGROUND OF THE INVENTION

This invention relates to a toll paying system for use with a turnpike/toll road toll booth, and more particularly to a toll paying system for use with a vehicle passing through a fast lane having a toll booth having electronic means for paying a toll.

1. Description of the Prior Art

The highway and roadway systems in the United States are the main transportation thoroughfares in America today. Millions of citizens use the highways on a daily basis. Traffic density is particularly acute during commuter rush hour due to the large percentage of the population which utilizes the roadways during peak hours. Faced with the task of funding certain bridges, tunnels, and arteries, many states and cities have for years chosen the fair policy of obtaining revenue for these costly facilities from the motorists and commercial traffic which use them. As a result hundreds of toll stations exist, most of which are located on the East Coast of the United States. Yet these payment collection sites, which are the economic lifeblood of the Highway Authority, are themselves the root cause of extreme problems, simply because the traffic must come to a complete stop in order to render payment. The overwhelming bottleneck associated with certain existing toll stations is best summarized from factual verifiable examples of several representative situations.

As an example of the problem, consider data collected at the Tappan Zee Bridge during morning rush hour on Wednesday, July 13, 1988, which is typical of normal work days. Weather was sunny, 70°. With all 13 toll lanes open, it took between 17 to 20 minutes for vehicles to progress through the line of stopped traffic waiting to move up to the toll booths. During the period between 7:15 a.m. and 8:45 a.m. a minimum of 2000 vehicles were counted, stopped in line and for a period, more than 4000 vehicles were counted.

The throughput rate of all 13 toll lanes combined was counted to be as follows. Some minutes experienced a rate of 60 to 70 vehicles per minute; other minutes experienced rates of 70 to 90 vehicles per minute; other minutes experienced 90 to 110 vehicles per minute; very occasionally was there a minute with over 110 vehicles per minute. This is the aggregate sum of all 13 toll lanes combined. The rate depends on whether drivers have exact change, how many 18 wheel tractor tailors are present, etc. An example of a "per lane" rate is as follows: For a minute with 91 vehicles for all 13 lanes, the average per lane rate is 91/13=only 7 vehicles per minute for one toll lane.

On the Tappan Zee Bridge, note that toll points exist only in west to east direction. The amount of fuel that is consumed by thousands upon thousands of vehicles that travel at 55 m.p.h., come to a full stop, stop and go for more than 17 to 25 minutes, and then accelerate back up to 55 m.p.h. can only be estimated. However even extremely conservative estimates would be dramatic in light of the fact it happens during morning and evening rush hours, each working day, all year round, year after year. The deleterious consequences of this extends to the environment in that the congestion in the air due to the incredible build up of carbon monoxide and other lethal engine exhausts which plague the people waiting in line as well as the staff of toll collection agents. The impact also is in terms of international trade imbalance since some of this massive amount of fuel is purchased outside of the United States.

The amount of cumulative time spent by members of the United States population in simply waiting in a stopped line to pay traffic tolls is staggering. An example of this is as follows. Although many thousands of motorists use the Tappan Zee Bridge during each commute, the number 2000 will be used purely for illustrative purposes. Conservative numbers will be used. Fifty weeks per year will be used to account for vacation.

(2000 motorists)×(0.25 hours stopped per commute)×(twice per day)×(5 days per week)×(50 weeks per year)=250,000 hours per year. In fact the actual number is millions of hours per year spent by members of the United States population waiting in line.

As another example, consider the Maine Turnpike. The information reported here was announced on commercial radio stations in Portland, Me. the day after Memorial Day Weekend, 1988.

During the late afternoon and into the evening of May 30, 1988, a monumental traffic jam in the southbound direction of the Maine Turnpike was caused by the toll stations at the southern most point of the highway. The traffic jam was the result of tens of thousands of motorists leaving the Pine Tree State all at the same time and returning to their homes at the end of the Memorial Day Holiday weekend. For several hours traffic was virtually stopped for a length of 40 miles, from Biddeford to Kittery. This traffic jam is part of the repeating pattern which manifests itself at the closing hours of all major holidays throughout the year in Maine, Vacationland.

As a further example of the problem, consider the Pennsylvania Turnpike. The information reported here was broadcast on television stations in Washington, D.C. At the beginning and at the end of the Thanksgiving Weekend, 1988, there were significant delays for motorists at certain toll points on the Pennsylvania Turnpike.

Another example of the problem is the Massachusetts Turnpike. Data were collected during 1985 while commuting on the Mass Pike during rush hour during every working day, except vacation, of that year. The toll station on the Massachusetts Turnpike, Route 90, at the exit point for Route 128 typically introduced a wait of over 3 minutes. However many times the delay was as long as 5 or 8 minutes. There also were days when it was longer.

For the Tobin Bridge, Boston, Mass., information has been reported live during rush hour over WBZ Radio. Every working day during both commutes there is a delay at the toll stations on the Tobin Bridge.

Elsewhere, the Governor of Maryland in 1989 ordered the closing of one direction of the toll stations on the route 50 bridge near Annapolis due to the overwhelming agglomerative traffic jam every rush hour.

Along interstate 95, between Philadelphia and the Nation's Capitol there are three toll collection sites. At each site there are consistent delays at the toll stations during each rush hour commute.

Many other examples could be given such as the Garden State Parkway, New Jersey turnpike, and toll tunnels.

The problem actually goes deeper than how it appears on the surface. Certain high population centers in the United States are presently seeking huge amounts of cash to pay for existing roadway maintenance and to fund urgently needed new highways. These communities presently do not have toll roads because tolls may be out of the question due to the traffic jams. This is ironic because tolls charged to the vehicles that use the roads are a way to pay for them. Real estate tax increases may be unfair for additional road development because the taxpayer seldom would pay a dollar amount proportional to approximating his/her personal use of the roads. Furthermore, many people outside the tax base also use the roads. Funding from the Federal Government for road repairs appears difficult due to the monstrous deficit.

Examples of geographic regions which are seeking funds for roadway construction and maintenance include Fairfax, Va., where the Fairfax County Board of Supervisors has announced that Fairfax Co. must raise one hundred million dollars additional revenue per year to fund roadway development. This development is urgently needed due to the explosive growth that is being experienced in Fairfax Co. More than one billion dollars reportedly is required for road system development.

The Fairfax Journal Newspaper during 1989 has run front page articles several times a week about the roadway problem and funding. The usual proposals are real estate tax, gas tax, or reduction of revenues of other programs. For example, the front page of Apr. 21, 1989 speaks of obtaining highway funding by slashing county money currently providing "medical care for sick children".

The private sector is addressing a subset of the problem. The Dec. 29, 1988 edition of the Washington Post reported that a company is seeking authorization for a Dulles Toll Road extension. Expected toll revenues are from 70 thousand vehicles for each commute. The same company is offering to refurbish the Wilson Bridge, notorious for massive traffic flow, and to pay for it by establishing tolls.

Routes 495 and 95, the Beltway around Washington, D.C., is an example where the television stations have reported that transportation planners are seeking massive amounts of money to pay for improvements to the Beltway. The option of tolls has been considered. Public discussion has been held to consider the possibility of constructing another beltway and/or bypass to relieve the unacceptable congestion and density that presently exists on the beltway. Television stations report that during each commute more than 700,000 vehicles use the beltway, every working day.

Washington, D.C. television station, WETA, announced the results of a viewer survey poll about how to pay for desperately needed roads. The report of December 1988 listed categories including tolls only; tolls plus certain taxes; etc. Forty-seven percent of the viewers chose tolls in one form or another. Yet this was with the knowledge that extremely long lines would develop. It is assumed that higher percentages would result if it is known that there would be no waiting. Undoubtedly, the percentage would drop to zero if the television audience were told that conventional toll booths would be used and the expected line on the Capitol Beltway will be 50 to 125 thousand cars at each toll station and the wait will be 20 hours per car. ((125,000 cars)/(100 cars/minute))×(1/60 hour/minute)=20.83 hours. This will indeed be the wait if the same traffic throughput is realized as is presently experienced on the Tappan Zee Bridge.

The nationally syndicated television program "Adam Smith's Money World", during December 1988, ran a story concerning roadway improvement. Top government executives were interviewed. The program ended with Adam Smith saying "it appears many or most roads will become toll roads".

2. Prior Art Approaches

In the prior art, a number of systems have been proposed for paying tolls at a toll booth using transponders and other radio techniques. See U.S. Pat. No. 4,303,904 to Chasek, which is incorporated herein by reference. Such prior art systems have problems with the base station illuminating each distinct vehicle transponder sequentially. In order to prevent simultaneously "illuminating" more than one vehicle, an extraordinary electromagnetic field density gradient would be used, when vehicles are close together. This gradient may be in excess of 100 dB per 15 feet for acceptable probability of detection and probability of false alarm performance in theoretical receiver operating characteristics curves. Having a gradient of much greater than 100 dB per 15 feet is impossible to achieve in the real world of actual traffic lanes because of specular reflection multipath and diffuse scattering multipath reflections and standing waves that occur due to closely spaced vehicles, the roadway pavement, lane dividers (jersey barriers), and "blockage", such as when it is desired to illuminate a flat front van that is 20 feet behind an 18 wheel box trailer tractor trailer truck, while preventing illumination of the vehicle behind the van.

The traffic at the toll payment entrance end of Boston's Sumner Tunnel and Callahan Tunnel, due to traffic congestion at the tunnel exit end, is often flowing at 5 or 20 miles per hour. Under this condition, two motorcycles may be separated by only one foot. The transponders, one on each motorcycle, would then be separated by 8 ft. This separation requires "well in excess of" 100 dB per 15 feet. For this example the problems are compounded due to electromagnetic field density fluctuations caused by metal surfaces of small vehicles such as "California Shorts", Volkswagen Bugs, and 1932 Deuce Coupes.

In the prior art a technical approach of using only one frequency for vehicle transponder signals is used. Problems with this approach are that toll payment stations which use more than one traffic lane as "electronic toll payment lanes" experience co-channel frequency interference since transponders in several traffic lanes compete for use of only one frequency.

In future years, the "one frequency" may be used by other systems, including commercial communications; harmonic frequencies of television station transmitters that would be built near the toll station; would-be toll violators who would attempt to build illegal electronic instruments to pay the toll, would know what frequency to build into the equipment.

In the prior art the technical approach of using a mechanical "vehicle pass or reject mechanism" suffers practical problems. Fatal accidents can occur as a result of stopping a line of high speed traffic which is transiting through the toll payment lane. Of course, a coin cash collection basket may be at the "stop gate" for a vehicle which has been stopped due to nonpayment. A toll station attendant would have to walk out to the stopped vehicle to service the transaction to give change.

In the prior art the technical approach of using the same unique transponder digital message each time the transponder is used for all toll payments suffers practical problems. This approach lacks electronic counter measures. Would-be computer-hackers who would attempt to receive someone's signal, build an instrument to clone the signal, and use the signal illegally would be able to do so.

In the prior art the technical approach of using a "half wave distributed filter" as the RF tuning mechanism suffers practical problems. The microwave filter is recursive. The canonical structure does not yield acceptable stop band rejection. The "second order" distributed filter approximation function does not support steep attenuation skirts. The filter does not realize flat group delay. The communications link is not memoryless due to the nonlinear insertion phase filter. Flat group delay is required in digital communications in order to minimize intersymbol interference. The filter does not yield a flat pass band, thus energy is wasted. There's going to be low return loss due to a high VSWR at the input port.

In the prior art other reasons which contribute to a higher than necessary bit error rate in the real stochastic world are as follows. The tunnel diode approach suffers unnecessarily high phase noise. The available time bandwidth product is not used to capacity. The signal is neither antipodal nor orthogonal, thus prone to errors—loss of money—in lightning storms and in the presence of co-channel interference such as harmonics of a CB, ham, or other transmitter in a nearby vehicle. The presence of a clock wastes energy and time. The rectangular and trapezoidal time domain clock/signal windows give rise to a degradation in the energy density in the frequency domain. The lack of error correction further causes money to be lost. The single, once only, transponder reply denies verification, an acute problem during thunderstorms. For these reasons from a systems integrity standpoint, the covariance matrix resulting from the prior art approach is significantly greater that the inverted Fisher Information Matrix of the communications channel and as a result money is unnecessarily placed in jeopardy. Stated linearly, these ingredients for the prior art result in a bit error rate that is much worse (logarithmically 70, 80, 90 dB depending on the Hilbert Space state transition matrix) than necessary within the framework of Information Theory, Communications Theory, Stochastic Systems Theory, Optimization Theory, Multivariate Analysis Theory, Coding Theory, Estimation Theory, Electromagnetic Field Theory, Detection Theory, Microwave Theory, and the Theory of Signal Processing.

OBJECTS OF THE INVENTION

It is an object of the present invention to provide a toll paying system for use with a vehicle passing in a fast lane through a toll booth, using a remote credit or debit card which can be used at a distance from an electronic base transaction facility.

It is an object of the present invention to provide a toll paying system for use with a vehicle passing in a fast lane through a toll booth, using a base transaction installation which negotiates or implements financial funds transfer from remote credit or debit cards.

It is another object of the present invention to provide a toll paying system for use with a vehicle passing in a fast lane through a toll booth wherein it is almost impossible to achieve electronic countermeasures for defeating, circumventing, illegally using, violating, or illegally siphoning money from electronic funds transfers between remote credit or debit cards and base transaction facilities.

It is another object of the present invention to provide a toll paying system for use with a vehicle passing in a fast lane through a toll booth, having means for: paying toll transactions at highway turnpike toll stations without stopping the motor vehicle; paying urban subway fares without the need for subway tokens or cards, thus avoiding long lines for purchasing tokens and inserting tokens at turnstiles; pre-ordering and prepaying consumer goods from a moving vehicle such as food, lodging, and related consumer items; giving rush hour highway traffic conditions, road conditions during snow storm, and alternate traffic routes.

It is another object of the present invention to provide a toll paying system for use with a vehicle passing in a fast lane through a toll booth, having electronic mechanisms which yield the lowest bit error rate for the constraints involved, that the laws of mathematics or information theory will allow for remote electronics funds transfers. This includes electronic circuitry performance that achieves the Cramer-Rao Lower Bound or the Ziv-Zakai Lower Bound.

It is another object of the present invention to provide a toll paying system for use with a vehicle passing in a fast lane through a toll booth, having complement techniques to use during remote funds transfers which allow successful, correct, and verifiable negotiations of remote monetary funds transfers despite the case when, due to low signal to noise ratio, the bit error rate becomes unacceptably high.

It is another object of the present invention to provide a toll paying system for use with a vehicle passing in a fast lane through a toll booth, having a utility which identifies the toll turnpike class of motor vehicles as they pay tolls at toll stations without stopping. For example, the utility electronic system distinguishes between passenger cars, tractor trailers, motorcycles, recreational vehicles, etc. so that proper turnpike fare is paid by these vehicle classes, as they make toll payments at toll stations without stopping.

It is another object of the present invention to provide a toll paying system for use with a vehicle passing in a fast lane through a toll booth, with solutions to the extremely high communications channel density problems which exist for remote credit or debit card scenarios for the case when thousands of vehicles per hour are paying tolls at toll stations without stopping during commuter peak rush hour traffic conditions.

It is another object of the present invention to provide a toll paying system for use with a vehicle passing in a fast lane through a toll booth, with a basis for wall board message displays for use by moving traffic as vehicles use remote credit or debit cards.

It is another object of the present invention to provide a toll paying system for use with a vehicle passing in a fast lane through a toll booth, having electronic security measures which apprehend would-be toll evaders if they attempt to get by moving-traffic toll lanes without paying. This allows the state or turnpike authority to apprehend and prosecute all would-be toll evaders.

It is another object of the present invention to provide a toll paying system for use with a vehicle passing in a fast lane through a toll booth, wherein it is almost impossible for the owner, operator, licensee, or maintenance personnel of the toll road base transaction electronic equipment to steal the turnpike authority's money for this system.

It is another object of the present invention to provide a toll paying system for use with a vehicle passing in a fast lane through a toll booth, which prevents a thief from illegally using a stolen remote credit or debit card.

It is another object of the present invention to provide a toll paying system for use with a vehicle passing in a fast lane through a toll booth, using an electronic digital signal processing hyperspace vectorspace having a dimension of several million bases which is the vehicle of remote credit or debit card funds transfers. This includes but is not limited to all convex spaces, all concave spaces, all orthants, all maximal proper linear variety affine spaces, all complex vector space tangential hyperspace bordered hessians, all row space operators, all range space operators, all nullspace kernals, all left nullspace kernals, all idempotent projection matrices onto orthogonal column vectorspaces, all Banach spaces, all pre-Hilbert spaces and all Hilbert spaces.

It is another object of the present invention to provide a toll paying system for use with a vehicle passing in a fast lane through a toll booth, using microwave hardware architecture which establishes the electronic circuitry whereby remote credit or debit cards and base transaction installation equipment operate.

It is another object of the present invention to provide a toll paying system for use with a vehicle passing in a fast lane through a toll booth, using a computer scheme and a finite state machine scheme to implement the concept of remote credit or debit cards and base transaction equipment.

It is another object of the present invention to provide a toll paying system for use with a vehicle passing in a fast lane through a toll booth, using, for example, adaptive digital signal processing strategies, which result in the fact that different codewords and message words are used for each time the remote credit or debit card is used. This, one of the many, electronic counter counter measures defeats and nullifies would-be computer-hack thieves.

It is another object of the present invention to provide a toll paying system for use with a vehicle passing in a fast lane through a toll booth, having a user friendly keyboard for the user of a remote credit or debit card so that it is no more difficult to use, during rush hour traffic conditions, than an automobile FM radio or cassette tape player.

It is another object of the present invention to provide a toll paying system for use with a vehicle passing in a fast lane through a toll booth, using a remote credit or debit card approach for avoiding the problems of conventional rush hour toll station payment including long traffic tie-ups, excessive pollution caused by stopped traffic which is waiting in line to pay tolls, and wasted gasoline expenditures caused by idling engines and stop or start of vehicles.

It is another object of the present invention to provide a toll paying system for use with a vehicle passing in a fast lane through a toll booth, for measuring real time traffic flow throughout metropolitan cities in order to give instantaeous information to remote credit or debit card users concerning traffic conditions.

It is another object of the present invention to provide a toll paying system for use with a vehicle passing in a fast lane through a toll booth, having a route to measure the bit error rate of the remote credit or debit card communications link.

It is another object of the present invention to provide a toll paying system for use with a vehicle passing in a fast lane through a toll booth, having a communications means for error correction and detection.

It is another object of the present invention to provide a toll paying system for use with a vehicle passing in a fast lane through a toll booth, using discriminant parameters as bases for signal processing.

It is another object of the present invention to provide a toll paying system for use with a vehicle passing in a fast lane through a toll booth, having means for providing standby electrical power to toll booth equipment for back up power in the event primary electrical power, such as supplied by electric company, fails or experiences brown out. The means includes, but is not limited to, standby generators, batteries, and alternate power feeds.

It is another object of the present invention to provide a toll paying system for use with a vehicle passing in a fast lane through a toll booth, having means for successfully overcoming user operator errors on the part of the operator of the vehicle toll payment instrument.

It is another object of the present invention to provide a toll paying system for use with a vehicle passing in a fast lane through a toll booth, having more than one toll booth sensor for communications link. The multiple sensors include, but are not restricted to, visible optics sensors, super-resolution beamsplitting adaptive phased arrays, super-resolution beamsplitting deterministic phased arrays, super-resolution beamsplitting hybrid adaptive/deterministic phased arrays, multiplexed antennas, redundant parallel processing antennas, diverse polarization antennas, invisible optics sensors, and lasers. The multiple sensors provide increased degrees of freedom for: safeguards of data link; direction finding; geolocation; and beamforming to reject and null co-channel interference within the space - time - frequency communications channel.

It is another object of the present invention to provide a toll paying system for use with a vehicle passing in a fast lane through a toll booth, having means to supply legal evidence concerning toll event in the event the consumer disputes the bill charged after the fact.

It is another object of the present invention to provide a toll paying system for use with a vehicle passing in a fast lane through a toll booth, having means wherein user of toll payment credit card or debit card in the vehicle can select in real time as to which particular authorized financial account to charge the current toll payment. This allows one in the same toll payment credit card or debit card to be used for either personal transactions or business transactions as selected by the user.

It is another object of the present invention to provide a toll paying system for use with a vehicle passing in a fast lane through a toll booth, having means to engage the full time bandwidth product available to the communications link during the vehicle's dynamic transit through the fast lane or toll booth.

It is another object of the present invention to provide a toll paying system for use with a vehicle passing in a fast lane through a toll booth, using a base transaction installation which provides means for achieving minimum hyperspace error for identification and recognition of invalid, or non-negotiable, or counterfeit communications signals which embody the essence and structure of a valid plenipotentiary signal, yet the invalid signals are not negotiable.

It is another object of the present invention to provide a toll paying system for use with a vehicle passing in a fast lane through a toll booth, using a base transaction installation having means wherein minimum error or greatly reduced error is achieved for the signal detection process. The means includes, but is not limited to Neyman-Pearson Detection, Akaike Information Criteria, Minimum Description Length, EDC, Likelihood Ratio Test, Hypothesis Testing, Matched Filter Detection, Coincidence Detection (from Radar Theory), Simkins LRT with Lawley-Bartlett Modification, Hyperspace Projector Operator Detection, Detection using the pseudo-inverse, least squares detection, detection wherein the error is orthogonal to the estimation, maximum likelihood detection, maximum entropy detection, discriminant detection, Marcum-Q, Hilbert Space Detection, Banach Space Detection, Pre-Hilbert Space Detection, Detection in any of the four fundamental vectorspaces, window detection, empirically set detection thresholds, M. Wax Detection, optimum threshold detection, and any of the hyperspace distance detection methods.

It is another object of the present invention to provide a toll paying system for use with a vehicle passing in a fast lane through a toll booth, having one or more photographic or television cameras for photographing the vehicle, license plates of the vehicle, driver of the vehicle, and/or toll payment instrument carried by the vehicle.

It is another object of the present invention to provide a toll paying system for use with a vehicle passing in a fast lane through a toll booth, having highway lighting which provides light for the fast lane during night and twilight hours.

It is another object of the present invention to provide a toll paying invention to provide a toll paying system for use with a vehicle passing in a fast lane through a toll booth, having means for providing transaction inquiry. This allows, if the consumer/motorist elects to participate in the optional "Inquiry Plan", for the family or loved one of the motorist to call by telephone the computers at the toll booth and use a touch tone phone to inquire as to whether or not the motorist has recently traveled through the toll facility. This optional "Inquiry Plan" is intended to notify the loved one that the motorist has or has not reached the toll station during snow storms, blizzards, hurricanes, or other dangerous storms, or in the event of vehicle breakdown such as a flat tire.

It is another object of the present invention to provide a toll paying system for use with a vehicle passing in a fast lane through a toll booth, having means for delivering the communications data from the vehicle to base transaction installation more than once. This redundancy includes, but is not limited to, having the data continually repeat. The means also includes but is not limited to having the repeat scheme nonstationary, so that each time the data repeats contiguously, it is reformatted differently.

It is another object of the present invention to provide a toll paying system for use with a vehicle passing in a fast lane through a toll booth, having means for maximizing the energy density of the communications data.

It is another object of the present invention to provide a toll paying system for use with a vehicle passing in a fast lane through a toll booth using base transaction installation, having means for communications between the base transaction installation and other toll booth base transaction installations which are located at distant localities. The communications also includes, but is not limited to, communications with one or more central facilities.

It is another object of the present invention to provide a toll paying system for use with a vehicle passing in a fast lane through a toll booth, having means to minimize the intersymbol interference of the data sent from toll payment instrument in the vehicle to base transaction installation.

It is another object of the present invention to provide a toll paying system for use with a vehicle passing in a fast lane through a toll booth using base transaction installation, having means for testing the electronic circuitry or equipment associated with the base transaction installation. The means includes but is not limited to automatic self testing, continuous self testing, and programmed self testing.

It is another object of the present invention to provide a toll paying system for use with a vehicle passing in a fast lane through a toll booth using communications receiver or data receiver for base transaction installation, having means for achieving low noise figure for the receiver.

It is another object of the present invention to provide a toll paying system for use with a vehicle passing in a fast lane through a toll booth using communications superhetrodyne receiver or data superhetrodyne receiver for base transaction installation, having means for achieving low phase noise for the local oscillator for the superhetrodyne receiver.

It is another object of the present invention to provide a toll paying system for use with a vehicle passing in a fast lane through a toll booth using communications receiver or data receiver for base transaction installation, having means for achieving extended dynamic range for the receiver.

It is another object of the present invention to provide a toll paying system for use with a vehicle passing in a fast lane through a toll booth using communications receiver or data receiver for base transaction installation, having means for establishing Inphase and Quadrature Signal Components for received signal in the receiver.

It is another object of the present invention to provide a toll paying system for use with a vehicle passing in a fast lane through a toll booth using communications receiver or data receiver for base transaction installation, having means for converting analog voltage or current into digital format for the receiver.

It is another object of the present invention to provide a toll paying system for use with a vehicle passing in a fast lane through a toll booth using communications receiver or data receiver for base transaction installation, having means for achieving optimum or near optimum signal processing for the receiver.

It is another object of the present invention to provide a toll paying system for use with a vehicle passing in a fast lane through a toll booth, having means for simultaneous utilization of more than one communications channel during signal transfer from the vehicle to base transaction installation. The means includes, but is not restricted to, the approach of exploitation of harmonics of the fundamental frequency, direct sequence spread spectrum which gives rise to broad bandwidth and concomitant additional degrees of freedom, and associated broadband approaches.

It is another object of the present invention to provide a toll paying system for use with a vehicle passing in a fast lane through a toll booth using base transaction installation, having means for the base transaction installation to identify which vehicle is sending the signal being tracked and received by the base transaction installation. The means includes, but is not restricted to, direction finding or geolocation signal processing.

It is another object of the present invention to provide a toll paying system for use with a vehicle passing in a fast lane through a toll booth having means for the toll paying system to transfer the State or Highway Authority's money into the State or Highway Bank Account in real time. The real time includes, but is not limited to, subsecond time for the money transfer and submicrosecond time the money transfer.

It is another object of the present invention to provide a toll paying system for use with a vehicle passing in a fast lane through a toll booth, having means for achieving optimal or near optimal high ratio of energy per bit to noise density for signal sent from the vehicle to base transaction installation.

It is another object of the present invention to provide a toll paying system for use with a vehicle passing in a fast lane through a toll booth, having means for communicating "Mail Messages" to driver of the vehicle for transit of the fast lane. The "Mail Messages" include, but are not restricted to, the selected option of telephone or cellular telephone interface to toll station base transaction installation computers and audio storage medium wherein, if the driver of the vehicle selects this option at time of order of toll payment credit card or debit card, a family member, loved one, friend, or business associate can call the mail message computers by touch tone telephone, use the touch tone keys to identify intended recipient (the vehicle driver), and then speak a very brief message into the telephone. The brief audio message is stored by mail message computers located at the toll station or at some central facility for dispatch to the appropriate toll station at the proper time when the target vehicle negotiates the fast lane, and the wallboard message display indicates that mail is waiting by flashing "Mail" or similar indicator. After the vehicle has passed the toll booth, the driver tunes the car standard AM or FM radio to a spot on the radio dial indicated by the wallboard. The stored audio message is then broadcast to the motorist's car radio. The transmission of the mail message occurs within a short distance after exit from toll booth, on the order of approximately three quarters of a mile to allow time for tuning the radio dial. An example of mail message is: "Donna, this is Lynne. Customer leaves on plane tonight and wants to sign contract NOW. Bye, bye." The mail message repeats more than once. Multiple frequencies, one to each vehicle, are assigned during heavy traffic density. The mail system complies with FCC regulations, in that transmitted radio signal power is below +20 dBm.

It is another object of the present invention to provide a toll paying system for use with a vehicle passing in a fast lane through a toll booth, having means for communicating "Commercial Mail" to driver of the vehicle for transit of the fast lane. The "Commercial Mail" includes, but is not restricted to, the scenario of the selected option whereby driver of the vehicle can call the toll station computers or central computer facility while he/she is at home and use touch tone telephone keys to establish membership or participation in a category of commercial classes. Then, during passage in the fast lane, if there is commercial mail corresponding to the selected category, the driver receives commercial mail in a manner similar to afore mentioned "Mail Messages". Examples of the categories include: Antiques, (Example Commercial Mail: "Welcome to Down East Maine. Charles Holmes' Antiques, Round Pond Offers a Federal Period Pristine Chippendale Low Boy".); Automobile Discount Price Tire Sales; and Oldies Records, (Example Commercial Mail: "B's Wax, Greenville, N.C. has one copy of the Pacific Ocean Blue Album by Dennis Wilson of the Beach Boys. We're in the Phone Book.")

It is another object of the present invention to provide a toll paying system for use with a vehicle passing in a fast lane through a toll booth, having means for communicating "Public Service Mail" to driver of the vehicle for transit of the fast lane. The "Public Service Mail" includes, but is not restricted to, the scenario of optional participation by driver of the vehicle in a category of public service classes in a manner similar to afore mentioned "Commercial Mail". Examples of the categories include: Church, Bible Study; Interstate Ski Conditions; State Surf Reports (Example: "Surf's Up to 12 Foot Swells Today at San Onofre, so Motor on Over to Hang 10 and Shoot These RAD Curls."); and car pools.

It is another object of the present invention to provide a toll paying system for use with a vehicle passing in a fast lane through a toll booth, having means to withdraw cash from Bank Automatic Teller Machines which are not located at toll station and which are equipped to interface with toll payment credit card or debit card.

It is another object of the present invention to provide a toll paying system for use with a vehicle passing in a fast lane through a toll booth, having means for the vehicle to send data to and/or receive data from home computer of driver of the vehicle or business computer of the driver.

It is another object of the present invention to provide a toll paying system for use with a vehicle passing in a fast lane through a toll booth, having means for purchasing consumer goods, consumer merchandise, and consumer material from a moving vehicle. The purchase does not transpire at the toll station.

It is another object of the present invention to provide a toll paying system for use with a vehicle passing in a fast lane through a toll booth, having means for indicating to driver of the vehicle what sections of large parking lots have parking space available as the vehicle approaches the major parking facility. The means includes, but is not restricted to, identifying contiguous vacant spaces with light beams, and communicating this information about where to quickly find a place to park to the driver. An example of a situation where a driver must find a place to park in a limited time is reported in the Apr. 24, 1989 edition of the Fairfax Journal Newspaper in an article on page A3 Titled "Outlook Grim for Dulles (International Airport) area Highways" where it is reported that traffic density (most of which are on the Dulles Toll Road) will grow to "Ten Thousand Cars Per Hour" and to "One Hundred and Twenty Thousand Cars Per Day". Clearly the person rushing to catch a plane will be impacted. (Related to the need for more toll roads, the same edition of the newspaper ran a front page story about road funding problems, as it does almost every day, stating "An abundance of transportation problems, but not enough money to fix them. With a long list of needs and a shortage of funds ...").

It is another object of the present invention to provide a toll paying system for use with a vehicle passing in a fast lane through a toll booth, having means to pay for parking lot fee as the vehicle exists parking lot.

It is another object of the present invention to provide a toll paying system for use with a vehicle passing in a fast lane through a toll booth, having means to communicate data: The means are visible or invisible optics; low power lasers of the nonhazardous category; or RF signals communicated from the vehicle to base transaction installation. The optics means includes, but is not limited to: Bar Code type Data Transfer; Active or Passive Optics Data Transfer; and Light Beams.

It is another object of the present invention to provide a toll paying system for use with a vehicle passing in a fast lane through a toll booth, having means to automatically dispense sand or salt onto the fast lane road surface during winter snow storms. The means includes method of dispensing sand/salt without impeding traffic, harming vehicles, or causing danger.

SUMMARY OF THE INVENTION

According to the present invention, as embodied and broadly described herein, a toll paying system for use with a vehicle passing through a fast lane, having a toll booth is provided. The toll paying system comprises detection means, class determining means, a wallboard, and a vehicle having both a first processor and a transmitter; a toll booth having antenna means, a receiver, a second processor, and camera means. The detection means may be embodied, for example, as a plurality of light beams traversing the fast lane with a plurality of light beam detectors. The light beam detectors generate a detection signal in response to a vehicle crossing the light beams. In general, the detection means generates a detection signal in response to detecting the presence of the vehicle in the fast lane. The class determining means may be embodied as an apparatus which determines the class of vehicle passing through the fast lane. The class of vehicle may be a car, truck, or any other type of class desirable for classifying vehicles passing through the toll paying system. The wallboard displays a message including tag information, in response to receiving the detection signal from the detection means.

The vehicle has a toll instrument. The toll instrument includes the first processor which stores identification data on the vehicle, and which has an input for inputting the tag information read by a passenger in the vehicle from the wallboard. The input of the first processor also can be used for inputting PIN number and transaction selection. The toll instrument includes the transmitter which is coupled to the first processor and which may be initiated by the passenger or the first processor for transmitting a signal. The signal may be repetitively transmitted, and it can include error correction/detection data, the tag information, the identification data, transaction data, synchronization frame and account data.

The toll booth has the antenna means which may be embodied as any type of directional antenna which can be used to form an antenna beam for reducing interference, and improving the reception of the signal transmitted by the transmitter; which can be used for Direction Finding or Geolocation during co-channel interference conditions or in the event the passenger makes a mistake when entering tag data or PIN data; and which can be used to gain additional degrees or freedom for multivariate signal processing. The toll booth also includes the receiver, which receives the transmitted signal from the transmitter. The second processor, which is located at the toll booth, is coupled to the receiver and to the detection means. The processor charges a toll fee to an account using the account data in response to receiving the account information, and necessary processing from the error correction/detection data, the tag information, and the identification data. The toll booths also include camera means which may be embodied as a camera. The camera can be coupled to the second processor and photographs a serial number on the toll instrument and the vehicle license plates in response to incorrect information being transmitted from the transmitter, or being incorrectly received by the receiver.

The present invention further includes a method for paying a toll for use with a vehicle passing through a fast lane having a toll booth. The method comprises the steps of communicating a message having tag information, inputting the tag information into a first processor located in the vehicle, and transmitting a signal having identification data from the transmitter located in the vehicle. The method further includes the steps of receiving the signal, with the identification data transmitted by the transmitter in the vehicle, by a receiver located at the toll booth, and charging a toll fee to an account using the identification data.

The present invention further includes alternative methods/means for implementation of a toll paying system in accordance with the itemized objects depicted in the previous section, Objects of the Invention.

Additional objects and advantages of the invention will be set forth in part in the description which follows, and in part will be obvious from the description, or may be learned by practice of the invention.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

FIG. 11 illustrates a method of vehicle tag assignment.

DETAILED DESCRIPTION OF THE PREFERRED EMBODIMENTS

Reference will now be made to the present preferred embodiments of the invention, examples of which are illustrated in the accompanying drawings.

Figure 1:
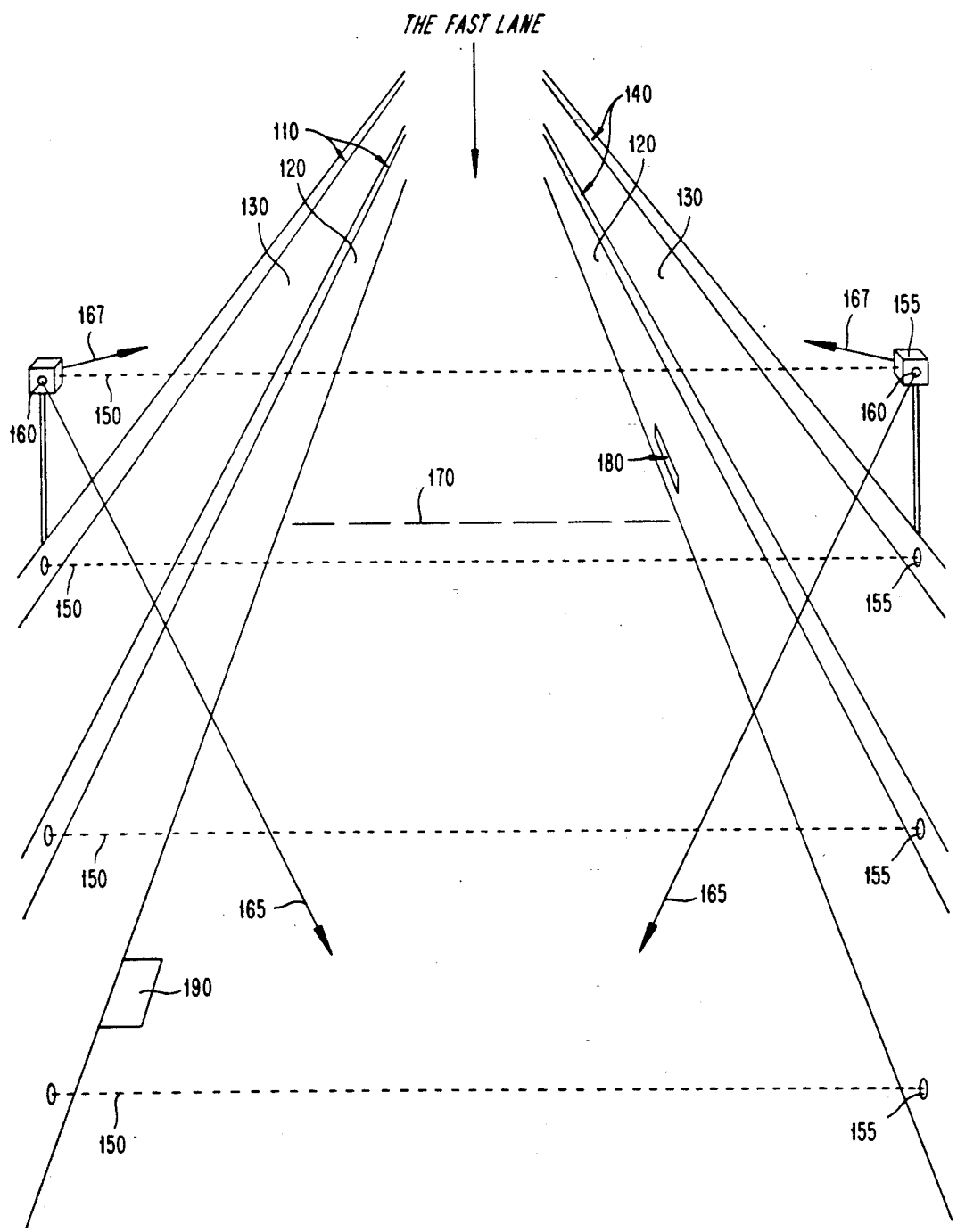
FIG. 1 illustrates the toll payment fast lane according to the present invention.

FIG. 1 illustratively shows the fast lane for the toll paying system of the instant invention. Shown are the detection means, class determining means, and a wallboard. The detection means is embodied as the lightbeam 150 traversing the fastlane to a sensor 155. Surrounding the fastlane are jersey barriers 120. The class determining means is embodied also as a sensor 155 for determining the class of a vehicle passing through the fastlane. The wallboard 130 is shown, which is responsive to a detection signal from the detection means, for displaying a message on the wallboard. The message may include tag information. Also shown are array antennas 110, 140 containing photo cells and cameras. Elevated cameras, 160, are shown with look direction 165 aimed down onto vehicle dashboard, and look direction 167 aimed at rear of passing vehicle for rear license plate photographs. Other look down cameras for dashboard are not shown but exist on platform or frame structure directly over the fastlane at an acceptable height. Other detection means 170 are shown embedded in road surface pavement and may be of the type similar to detection used at some traffic light intersections. Road sand or road salt dispenser apparatus 180 are shown for winter snow or ice conditions. Storm drain 190 is shown for water drainage. A vehicle typically passes through this fastlane.

Figure 2:
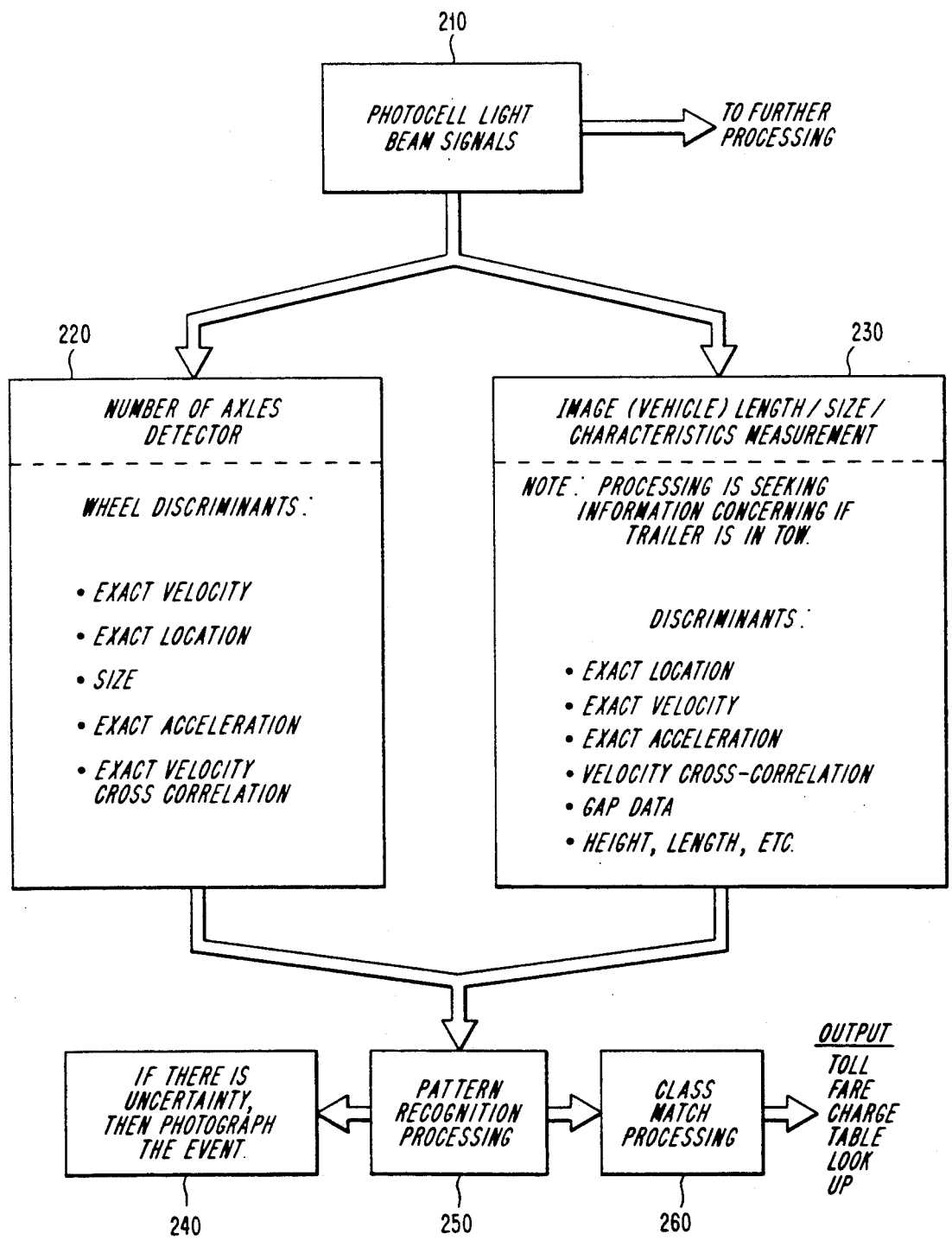
FIG. 2 shows a vehicle class type identifier according to the present invention.

FIG. 2 shows a vehicle class type identifier, which may be embodied as a processor. As shown, photo cell light beam signals 210 are coupled to a number of axle detectors 220 and to an image processor for vehicle length, size, characteristic measurement 230. The number of axle detectors 220 includes determining exact vehicle velocity, exact vehicle location, vehicle size, velocity cross correlation, and acceleration. The image length, size, characteristics measurement 230 determines exact vehicle velocity, vehicle location, acceleration, height, length, cross correlation, and other data. The number of axle detectors 220 and image characteristics measurement 230 are coupled to a pattern recognition processor 250. The pattern recognition processor determines if there is any uncertainty in the process data to thereby photograph an event 240, or determines a correlation class match processing 260 for outputting a charged fare to a toll.

In the instant invention, vehicles have a toll instrument, including a first processor located in the vehicle for storing identification data. The first processor also includes an input for inputting the tag information which may be read by a passenger or other means from the wallboard. The first processor further includes means for inputting a PIN number in transaction selection. The vehicle has a transmitter which is coupled to the first processor and in response to the passenger initiating the transmitter, it may repetitively transmit, in sequence, a signal having error correction/detection data, the tag information, identification data, transaction data, synchronization frame and account data. As identified and described in the Objects of the Invention and in the claims, a wide range of solutions for communicating data from the vehicle to the base transaction installation are included in the instant invention. One such example is a transmitter of the instant invention which is shown in FIG. 3.

Figure 3:
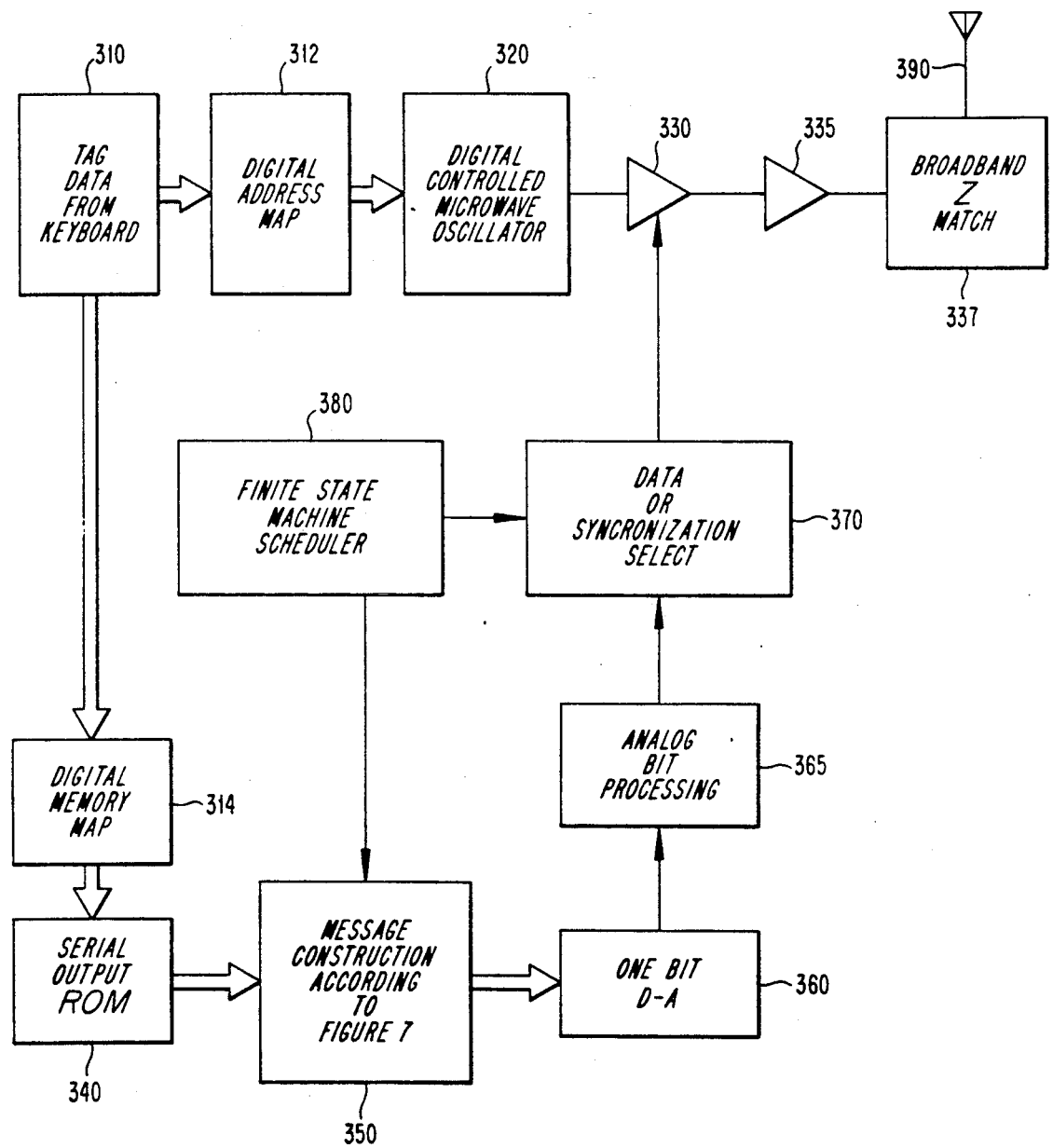
FIG. 3 illustrates a toll instrument transmitter and RF output circuit for the vehicle transmitter according to the present invention.

As depicted in FIG. 3, tag data 310 from the keyboard are digitally mapped 312 to form the word which sets the frequency of a microwave source 320. This CW low phase noise carrier is modulated in a convolution processor 330 which feeds an RF amplifier 335 that is impedance matched 337 to deliver signal into antenna 390. Tag data 310 also are memory mapped 314 to start address of read only memory (ROM) 340 which contains account data and error correcting data. ROM 340 is read out according to a scramble format defined by tag data. These data are combined with other data in the message construction facility 350 controlled by a Finite State Machine scheduler 380. Message data are converted 360 to analog data and modulation format 365 is then constructed. No clock is added to the chipping scheme for reasons that are obvious to hyperspace theoreticians. The message repeats continuously with synchronization 370 injected. The baseband signal then nonlinearly controls the carrier in the previously described modulator 330.

The present invention also includes the toll booth having antenna means, a receiver, a second processor and camera means. The antenna means may be embodied as antenna arrays 110 as shown in FIG. 1. Antenna means typically might have direction finding adaptive phased array capability and geolocation properties for association of specific vehicle with received signal despite co-channel interference; adaptive and/or deterministic beamforming for signal copy counter counter measures against co-channel interference for reducing interference and improving reception of the transmitted signal from the transmitter in the vehicle. The antenna array is coupled to a receiver which is located at the toll booth. The receiver receives the transmitted signal from the transmitter, where the signal may have error correction/detection data, tag information data, identification data, transaction data and account data.

Figure 4:
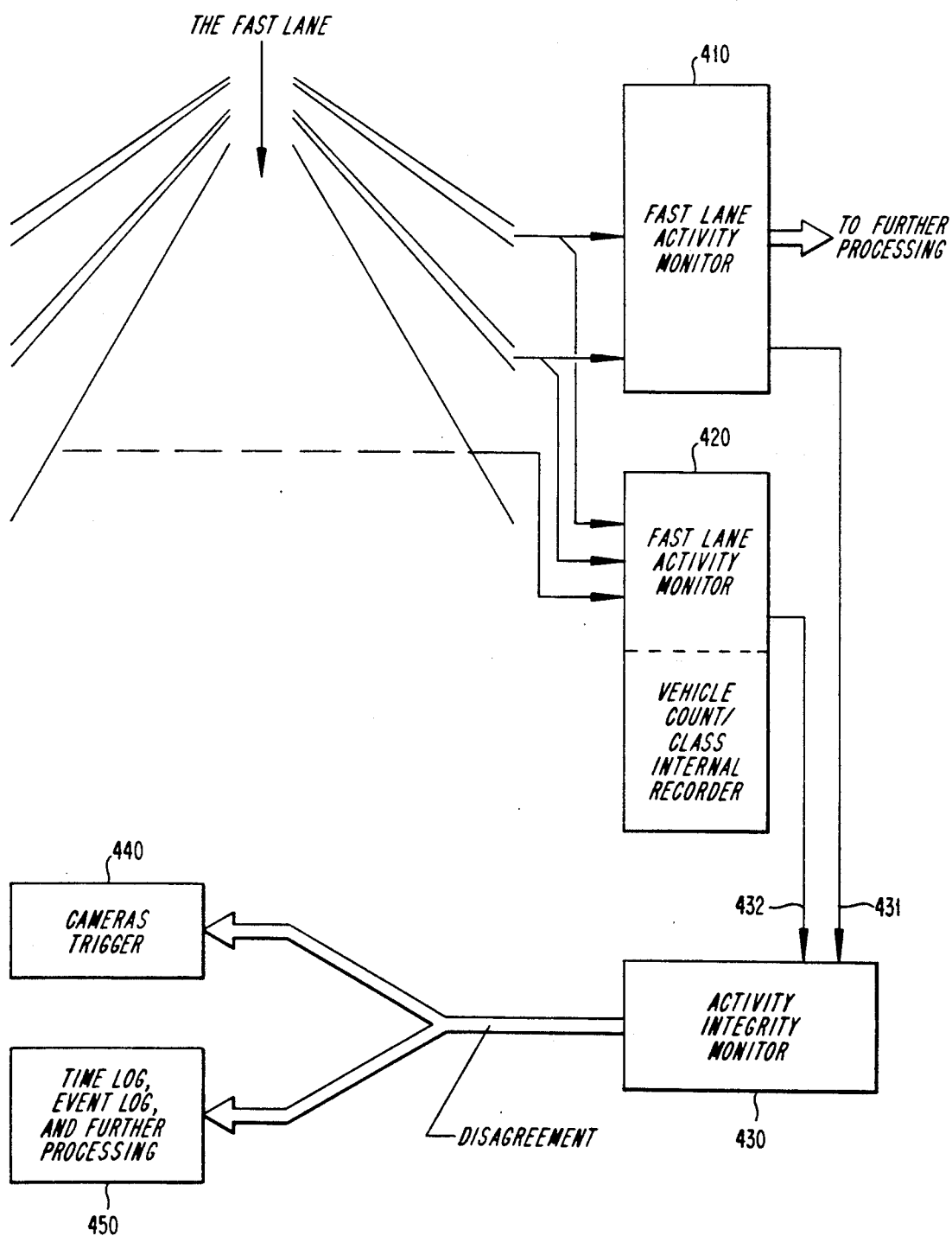
FIG. 4 illustrates a system approach to prevent turnpike authorities' toll money from being embezzled.

As shown in FIG. 4, a second processor, located at the toll booth, may include first lane activity monitor 410 and second lane activity monitor 420. The second processor is coupled to the receiver and to the lightbeam detectors 155 of FIG. 1 or any other detection means. The second processor in response to the transmitted error correction/detection data, tag information data, identification data and the account data verifies the tag information and charges a toll fee to an account using the account data. As shown, the second processor independently verifies by at least two different detection means, the lane activity. Data from the first lane activity monitor 410 and second lane activity monitor 420 are transferred to lane activity integrity monitor 430. The activity integrity monitor 430 is designed, engineered, built, maintained and supervised by independent third parties for accounting of data for the instant invention. Interference links 431, 432 which transfer data from lane activity monitors 410, 420 to activity integrity monitor 430 are mutually exclusive and inaccessible, secure, and equipped with an alarm apparatus.

The present invention also includes camera means which may be embodied as a camera coupled to camera trigger 440 of FIG. 4. The camera is coupled via the camera trigger 440 to the second processor and is responsive to disagreement between the fast lane activity monitors 410, 420 to resolve conflict if the two independent monitors 410, 420 do not agree concerning vehicle count and class type. Other causes for camera trigger exist for the instant invention and will be described in the following sections. Camera instruments responsive to camera trigger are for photographing the vehicle, a serial number or other unique identification scheme on the toll instrument in the vehicle, and possibly the vehicle's license plates. Time log and event log 450 are used for further processing of data from activity integrity monitor 430.

Figure 5:
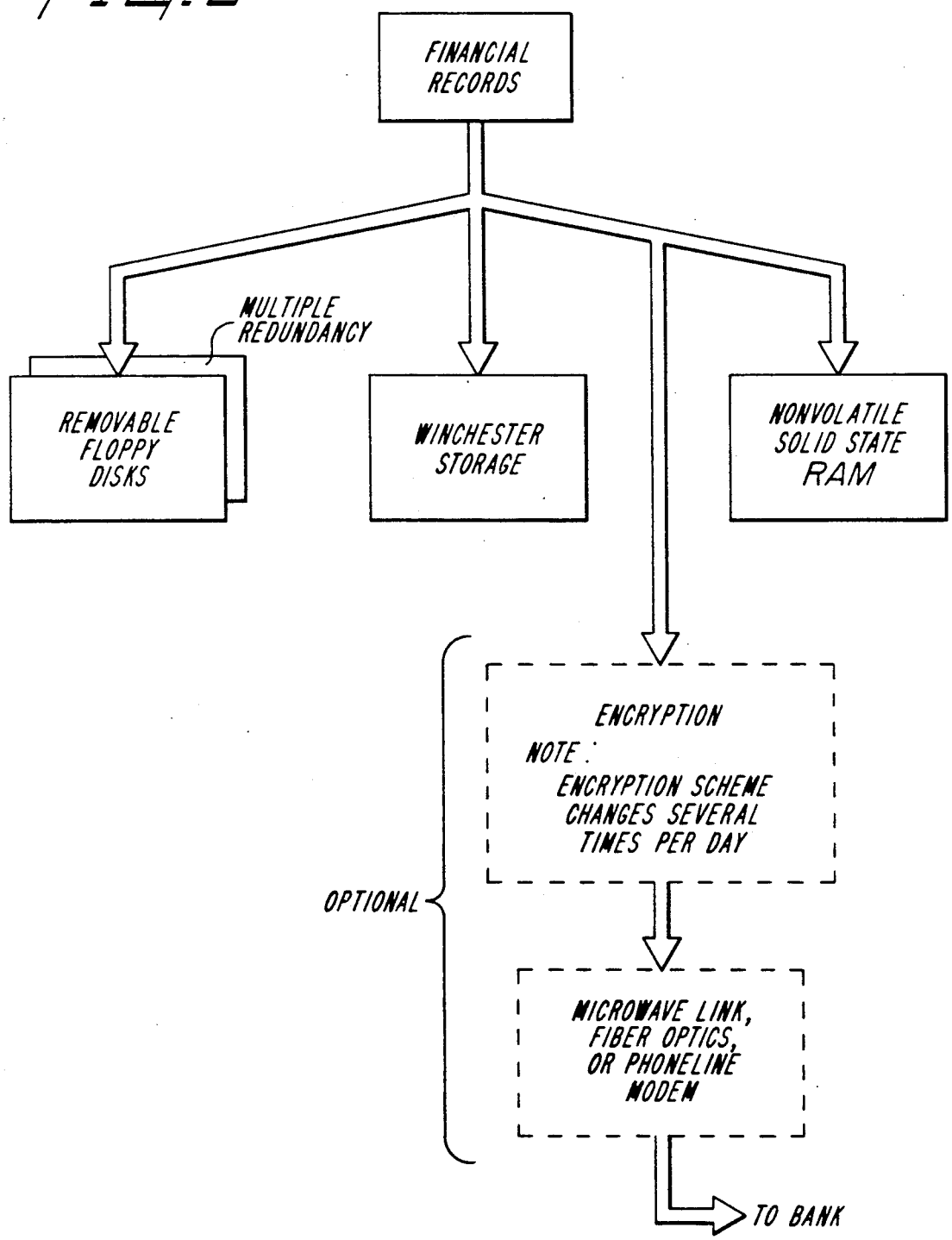
FIG. 5 depicts a financial records and logging method according to the present invention.

The present invention further includes, as shown in FIG. 5, financial records logging which may have financial data being passed to a processor using removable floppy disks, Winchester storage, or nonvolatile solid state random access memory (RAM). Data are further encrypted and passed through a communications channel which may be embodied as a microwave link, fiber optics link, or phone line to a bank for debiting an account. Security measures may be placed to prevent unauthorized parties from gaining access to records through this channel. These include mechanical measures, and access log keeping via electronic devices. The system also can be constructed to prevent access by anyone no matter who it is, except at one exact time of day. Further included may be security alarms. The entire base station power supplies are backed up by standby power in the event that the city 110 volt system is ground out or crashes.

Figure 6:
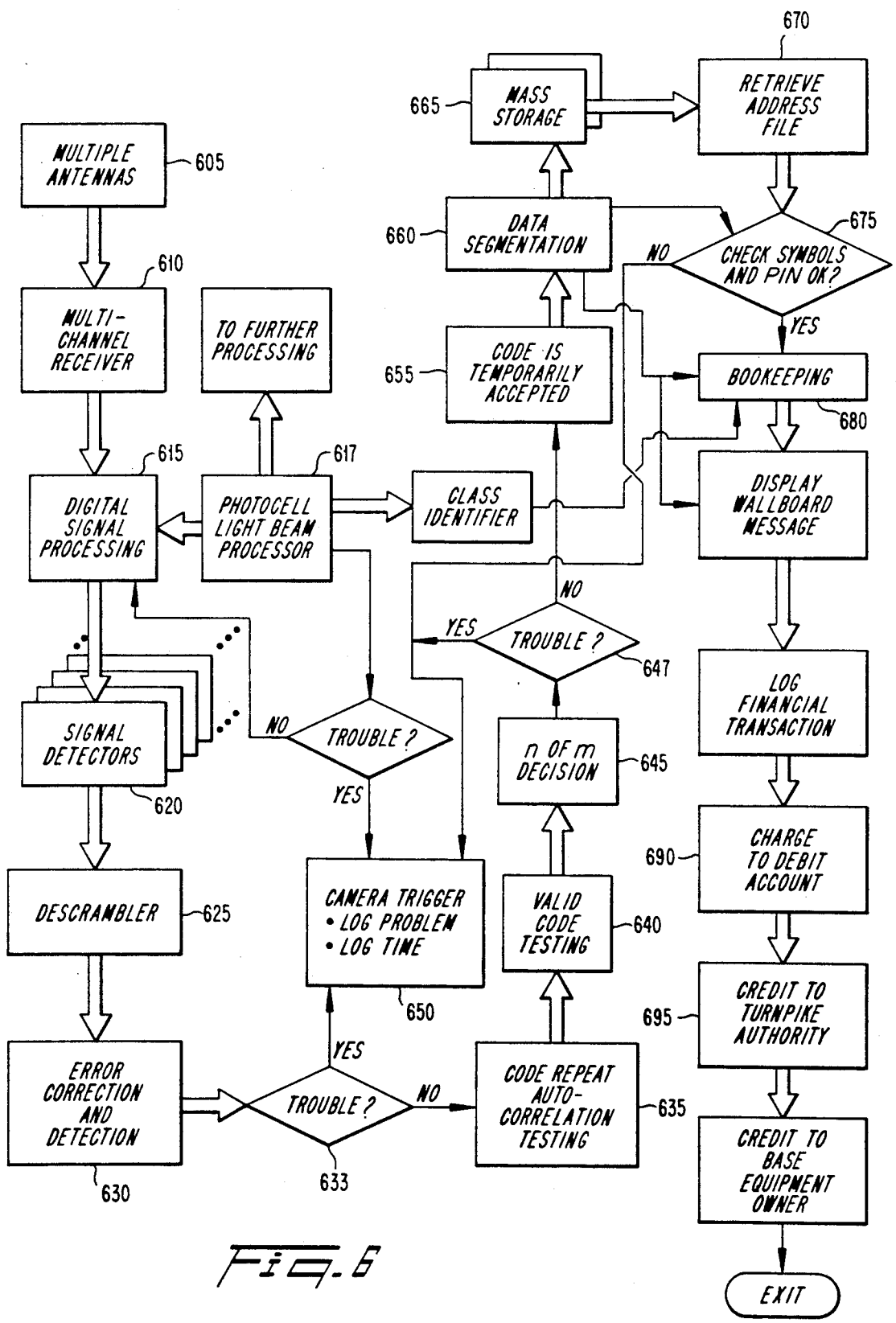
FIG. 6 shows a base station overview according to the present invention.

As shown in FIG. 6, a base station overview is shown with multiple antennas 605 coupled to a multichannel receiver 610 and thereafter to a digital signal processor 615. The digital signal processor 615 provides adaptive signal processing, adaptive filtering, stochastic signal processing, methods of optimization, parameter estimation processing, discriminant parameter processing, nonstationary signal processing, cyclostationary signal processing, hyperspace signal processing, statistical signal processing, maximum likelihood signal processing, communications methods signal processing, Information Theory methods signal processing, multivariate methods signal processing, state space signal processing, cumulant theory methods signal processing, matrix methods signal processing, phased array signal processing, and other related items. From the digital signal processor 615 the digital signals are passed to a family of detection processors 620 and are then descrambled 625 and passed through an error detection correction apparatus 630 and then to trouble branching stage 633 which provides process flow routing to cameras trigger 650 if trouble is detected 633. If there is a problem, a photographic signal 650 is sent to initiate taking a picture of the car or other aspects of the vehicle. If there is no problem then code is transferred from branch stage 633 to code repeat autocorrelation testing stage 635. In the instant invention means also are provided to trigger camera 650 if a vehicle is detected by vehicle presence detector such as, for example, light beam mechanism 617 but simultaneously no signal is detected by signal detector 620. The code repeat autocorrelation testing stage 635 passes code to valid code testing stage 640 and then the code is passed to decision intelligence stage 645 and then to problem branch stage 647 so that a camera is triggered 650 if there is a problem. If there is no problem, the code is temporarily accepted 655 and then segmented 660 and passed to mass storage 665. The portion of data which were segmented 660 for passing to mass storage 665 is the digital address of the account file data retained in mass storage 665. Thus the account file data are fetched from the address location in mass storage 665 and the account file data are loaded into retrieve address file registers 670. Included in account file data are PIN data and all required information concerning user account. The actual user PIN number which is called up from mass storage 665 and held, along with other account data, in retrieve file registers 670 is compared with the received PIN data which was separated, along with other data, from account data. The separation occurs in data segmentation 660. The comparison of received PIN, or password, with the actual PIN, or password, occurs when retrieved account data 670 are passed to a check symbol and password 675 to determine if it can correctly debit data from an account. If not, then photograph is taken 650. If debit can be charged to an account, the data from retrieve file registers 670 propagate through branch storage 675 and passes to bookkeeping 680 which is electronic housekeeping where transaction data are processed and associated electronic activities are transpired. Data from bookkeeping 680 ultimately pass to stage where toll fare is charged to user account 690 and then account data and financial data passes to stage 695 which credits the Turnpike Authority, State Highway Authority, or similar authority. The credit stage 695 electronically transfers toll fare money to turnpike authority financial account.

The present invention alternatively may be embodied as a method for paying a toll for use with a vehicle passing through a fastlane. The fastlane has a toll booth. The method comprises the steps of communicating a message having tag information from the toll booth to the vehicle, inputting the tag information into a first processor which is located in the vehicle, transmitting a signal having the tag information and identification data from the transmitter located in the vehicle, receiving the signal having the identification data by a receiver located at the toll booth, and charging a toll fee to an account using the identification data.

Figure 7:
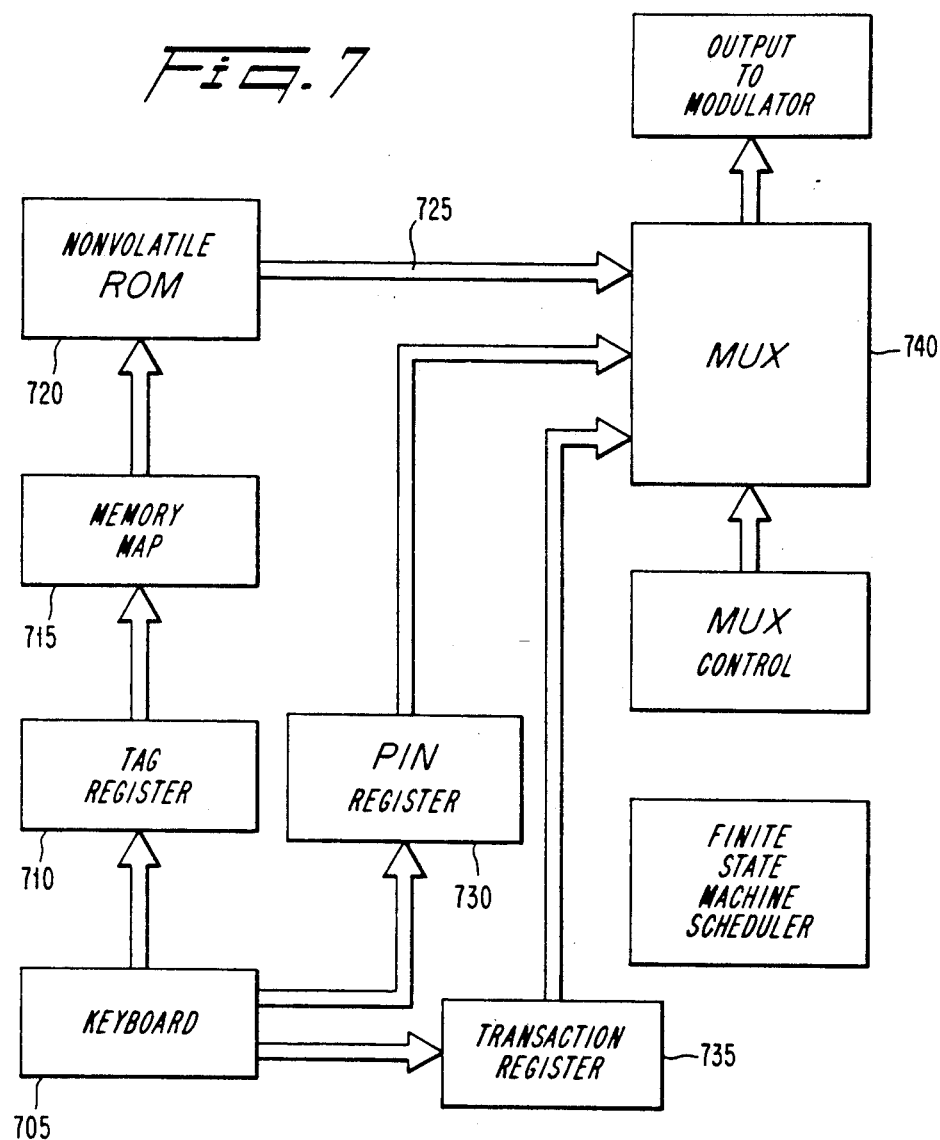
FIG. 7 shows a first processor for use in a vehicle.

FIG. 7 shows the first processor as would be located in the vehicle. As shown, a keyboard 705 would be coupled to an instrument tag register 710. The keyboard interface 705 would input the data read by a person in the vehicle. Data are then passed to memory map 715 which establishes address location data for nonvolatile ROM 720. Data contents of address location of ROM 720 are then passed 725 to a multiplexer 740. Data having the unique code word are scrambled differently for each of different possible transponder tag numbers. That is, the toll payment instrument transmits a different message each time it goes through the fastlane. Also shown in FIG. 7 are PIN Register 730 and Transaction Register 735 which accept data from keyboard 705 and pass the data to multiplexer 740.

Figure 8:
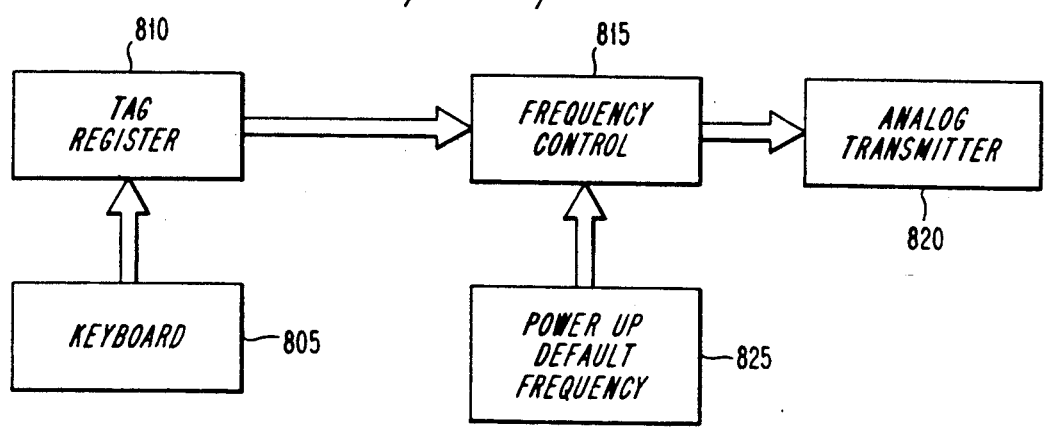
FIG. 8 illustrates frequency control of the transmitter.

FIG. 8 shows a frequency control according to the present invention. In FIG. 8, data are inputted from the keyboard 805 to the instrument tag register 810, and from the instrument tag register 810 to a frequency control 815 and to the analog transmitter 820 in the vehicle. At power up 825, before the tag number is entered, each instrument transmits on the same default frequency.

Figure 9:
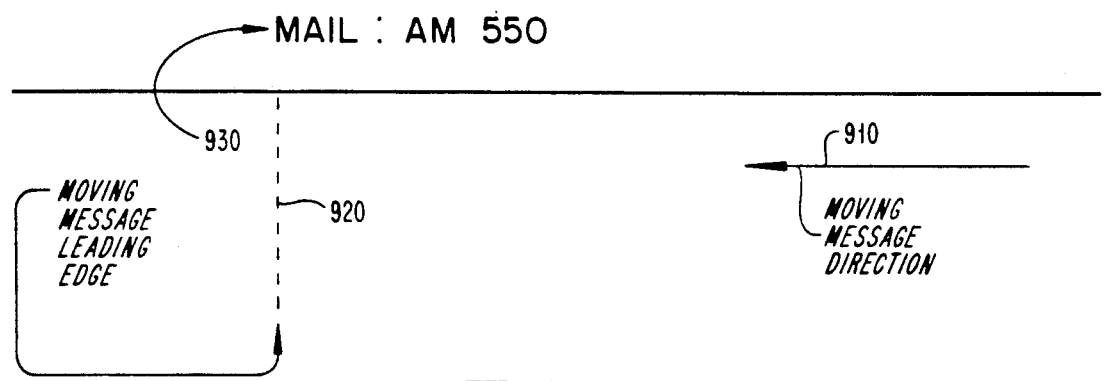
FIG. 9 illustrates a message wallboard.

FIG. 9 shows a wallboard according to the present invention. As shown, identification data, and balance, if requested, may be displayed. As indicated by FIG. 9, the instant invention provides means for message to move 910 along side vehicle. The leading edge 920 of message normally defaults to a distance approximately 2.5 meters in front of the vehicle bumper. In slow traffic conditions when safety allows the front bumper of the vehicle to be closer to the bumper of a car ahead of the vehicle, then leading edge 920 will automatically compress. Means for mail delivery are provided by wallboard 930 and car radio, if driver has requested mail dispatching by making a telephone call when the driver is at home. Transaction register request information also may be shown according to detail of FIG. 9. The instant invention also includes alternative methods for conveying visual data to vehicle driver including stationary message signs or electronic or mechanical stationary displays.

Figure 10:
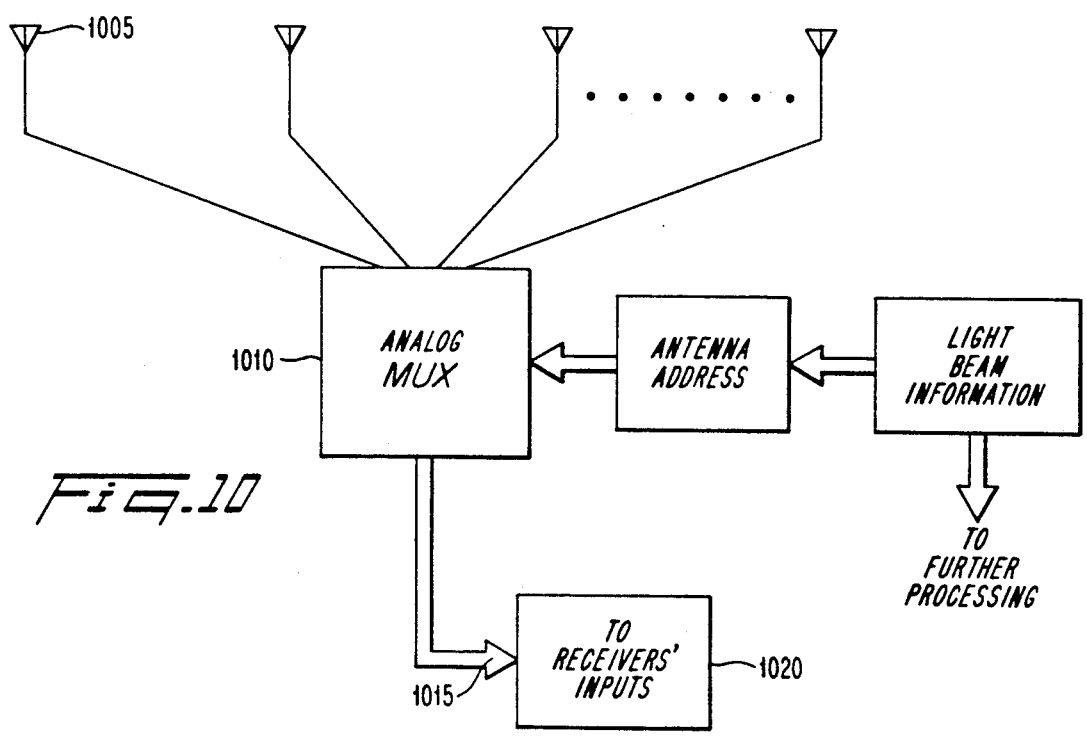
FIG. 10 is a diagram of a base station adaptive phased array.

FIG. 10 illustrates base station multiple antennas or other multiple sensor means including a plurality of antenna elements 1005 coupled to an analog switch 1010 having a high dynamic range, broadband frequency response, broadband impedance matching, very low noise figure, very fast settling time, extremely low switching radiated glitches, and low noise amplifiers. The multiple antenna sensors 1005 exhibit very low mutual coupling, i.e., low magnitude of transfer scattering parameters. Output 1015 of MUX 1010 connects certain sensors 1005 to certain receivers 1020. The instant invention includes data sensor means of other methods in addition to antennas 1005 for receiving communications data from vehicle.

FIG. 11 illustrates a vehicle tag assignment. From a field of all possible tag numbers 1105, base station programmable switch register 1115 for detecting occupied frequencies which are known a priori is coupled to a mask 1110. The mask 1110 is further coupled to a second mask 1120 which is coupled to a frequency scanner 1125 to monitor channel activity on frequency tag field. From the second mask 1120 a set of usable frequencies 1130 are available and displayed from a tag assignment sensor 1135 on a message wallboard 1140.

The toll paying system of the present invention has means for verification of fastlane traffic, vehicle class, and counting the number of vehicles engaging in the fastlane and financial accounting of the monetary transactions occurring in the fastlane. This is all done by radio means, by transmitting radio signal from the vehicle to the toll booth only. There are no transmissions of signals from the toll booth to the vehicles for the toll payment transaction. The communications link from the vehicle transmitter to the toll booth may be by any means, but not limited to RF means and/or optical means. The term vehicle transmitter is defined here in its most general meaning to include, but not restricted to, active transfer of data, passive transfer of data, or by any means. In transmitting signals from the vehicle to the toll booth in the instant invention, no clock is sent with the message bits. The message can repeat itself a plurality of times, by repetitive transmissions by the transmitter. The wallboard display includes all roadside electronic scene means which may be used to display data to the passenger in the automobile. This may include, for example, any future means for transmitting a signal, message, information, instructions, data, words, numbers, pictures, travel assistance intelligence, diagrams, symbols, ideas, themes, facts, news, or constructs from the toll booth or apparatus associated with the toll booth to a passenger in the vehicle. This includes, but is not limited to, nonelectronic message displays; mechanical displays; stationary signs; pointing arrows; roadside headlight reflectors; roadside running lights; roadside guidance lights; roadway nighttime illumination lights; and other message means or travel assistance information means.

The solution to the transportation bottleneck problem and the roadway funding problem identified in the instant invention is an instrument which negotiates monetary funds transfer remotely, in real time, thus allowing toll transaction payments to be made from a moving vehicle without stopping or without slowing down. This instrument is located in the vehicle and communicates electronically with central processing equipment located at the Turnpike Authority Toll Station. The instrument is a functional authorized credit card/debit card which is issued by banks, or the Turnpike Authority, or a licensed agency, whichever is selected by the governing (state or local) legislature or legally empowered institution. Certain traffic lanes are reserved for vehicles equipped with the instrument, while other lanes at the Toll Station are established to operate as conventional "stop and pay" lanes for vehicles not equipped with the instrument. Each instrument is serviced by a unique financial account, in a manner exactly like bank checking accounts. The instrument is small and portable and does not have to be "wired" or installed permanently into the vehicle.

The Fast Lane Credit Card, or FLCC, combines certain characteristics of the following building blocks, yet it is a unique conceptual element unto itself and differs in several regards from these same building blocks: a checking account; a debit card; a bank "Automatic Teller Machine".

Money is not "loaned" to the account associated with the FLCC, in the sense of a credit card or a pay-later account. Instead, money is paid to the Turnpike Authority from one of the following sources associated with the account: prepaid cash reserves; national credit card account issued to the motorist such as Visa, Discover Card, American Express, or Mastercard; a bank checking account with a positive cash balance. The motorist can change between these sources at will, with the touch as a button on the FLCC, if he/she so desires.

In the event the prepaid cash reserve are depleted, as well as all other sources of the account, the motorist pays for the toll, from a standby "cash fall-back account" required of all FLCC users. However, in the event this fall-back account is used, the motorist pays an additional penalty fee. Frequent use of the fall-back account will result in revocation of the instrument.

The Fast Lane Credit Card Instrument (hardware and use-authorization) does not belong to the motorist, but instead always remains the property of the issuing agent (bank, Turnpike Authority, etc.) and the terms of its use are set in accordance similar to national credit cards, that is it can be revoked, etc. Thus, the motorist signs a legally binding document agreeing to abide by the terms of the contract, which is renewed yearly. The same FLCC can be used at any Toll Station in any state so that different ones are not needed for different states.

Each "fast lane" at the nonstop toll payment point is divided from the other lanes with highway divider barriers, jersey barriers, or similar partitioning structures in a manor consistent with that which is normally done for conventional stop-and-pay Toll Booths. Long before the traffic arrives at the toll points (FLCC as well as stop-and-pay traffic) there are easy to understand roadway signs which prepare the motorists for the upcoming toll stations. These signs include warnings to would-be toll evaders that there are harsh, severe, serious legal penalties levied against motorists who drive in the fast lane without a Fast Lane Credit Card. The signs also caution would-be toll evaders that fast lane traffic is monitored and videotaped by closed circuit television cameras and exotic photography equipment. (High speed photography cameras are aimed at the front license plate, the back license plate, several angles of the driver, and several angles of the dashboard.)

As the traffic moves past the signs, the vehicles equipped with FLCC's move into the "Fast Lanes." The vehicles not equipped with FLCC's move into the stop and pay lanes. At this point jersey barriers are not yet present to separate the lanes. Drivers in the fast lane place the small Fast Lane Credit Card on the dashboard in front of the steering wheel, and turn on the Power-On switch of the FLCC. As part of the user agreement contract, signed by the motorist, the motorist agrees to position the FLCC on dashboard in front of the steering wheel, while in use. The light display on the face of the FLCC indicates to the driver that the FLCC batteries are fully charged. If the Power-On light does not illuminate, then the driver knows that the batteries are low and, as a result, the driver moves out of the fast lane into one of the stop and pay lanes.

On the face up side of the Fast Lane Credit Card is engraved a unique serial number which consists of numbers (and letters of the alphabet) or unique serial symbols that are printed on the surface of the FLCC and that are each approximately 2 centimeters in height. Since the Fast Lane Credit Card is placed on the vehicle dashboard, the FLCC serial number is visible by Toll Base Station cameras which are aimed at the dashboard. The dashboard is also lighted by lighting in the Fast Lane. The serial number is not the principal basis by which the toll transaction is made. Instead, the toll signals are transmitted by the FLCC. However the serial number is simply one more, out of many, items of evidence that is used to resolve disagreement, if a motorist contends that he/she was billed for a toll trip that he/she says he/she did not make. Of course, the photograph of the dashboard, and license plate, is used as evidence against would-be toll evaders if a person did not use his/her FLCC, but claims he/she did. The fact of an empty dashboard is the evidence.

After turning on the FLCC, the driver uses the keyboard on the FLCC to enter his/her "password" number, which is an identification number. This password number is similar in concept to the password or identification number for conventional bank ATM machines which dispense cash. The purpose of the password number is to prevent unauthorized use of the Fast Lane Credit Card. The keyboard of the FLCC is different from ATM machine keyboards in that the FLCC keyboard is significantly more user friendly. There are only four key numbers on the face of the FLCC. The numbers associated with each key are 1, 2, 3, 4 respectively. During the application process for the procurement of a FLCC, the requester specifies his/her chosen password. Examples of passwords that a person might wish for himself/herself are as follows: 3333; 2111; 2323; 1234; 4321; 1111; and 3142.

Note that the password number "2115" is not possible because there is no number 5 on any of the keys. There are 256 different possible valid passwords.

This password is not the only digital signal transmitted by the Fast Lane Credit Card to the Toll Station central processing computers. The FLCC also transmits other signals, one of which is a certain signal that has a unique fingerprint to each FLCC and is used together with the password, to identify the FLCC. Error correction capabilities and a wealth of electronic counter counter measures are inherent in the adaptive signal structure of these digital signals. There are many reasons for this exotic signal structure, but of course one of the reasons is that it makes it impossible for would-be thieves to build a "home made" or even an advanced electronics laboratory version of a counterfeit FLCC which illegally uses someone else's electronic signal. The reason is that the signal is nonstationary and therefore is impossible to capture.

Eventually the traffic reaches the point where jersey barriers partition the lanes. The jersey barriers very gradually rise up out of the pavement, are lit with flashing lights, and are cushioned with high-energy shock absorbers. Greater than normal safety precautions are taken. The jersey barrier rise point is heavily lighted.

When the Fast Lane traffic moves into the Fast Lane, the driver sees "moving message signs" on the jersey barriers. These moving messages are part of a "Moving Message Wallboard Display" which perform the same function as the TV screen at a conventional bank ATM machine. The moving message moves exactly at the same rate as the vehicle. As the vehicle speeds up or slows down, so does the moving message. Of course, there are no moving parts to the message wallboard display.

There are two moving message wallboard displays. The first is stacked and securely mounted on top of the left side jersey barriers. That is, the bottom of the display adjoins the top of the jersey barriers or similar type of dividers. The second is likewise located on top of the right side jersey barriers. As the vehicle moves into the wallboard region the left wallboard lights up with a different four-digit number for each vehicle. The lighted number moves with the vehicle. The succession of these four-digit numbers repeats every 256th vehicle but with some statistical variation so the succession progression is not the same. Each digit of this four-digit number will be either the number 1 or 2 or 3 or 4. An example of this number is 2133. Another example of this number is 3412. Another example is 1432. Another example is 2222. This number on the left moving wallboard display is called the "Tag Number." When the driver sees this four-digit tag number on the left wallboard, he/she enters the number on the keyboard of the Fast Lane Credit Card. As stated the utility of the present invention is designed to offer extremely user friendly features. Its location on the dashboard makes its view to the driver as easy to see or easier than the speedometer or headlight highbeam indicator. Its extreme proximity to the steering wheel makes it as easy to use or easier than the car radio, car tape player, car air conditioner, adjustment of the rear view mirror, etc.

The assignment by the Toll Station central computers of the tag number to the vehicle is done in a manner somewhat similar to the assignment of "Transponder Tag Numbers" in the airline industry. In the airline industry the air traffic controller notifies the commercial airline pilot of which "Tag Number" has been assigned to that particular aircraft during a certain segment of the flight. The pilot then enters this tag number into the aircraft transponder control panel in the cockpit. On a different flight the aircraft may be assigned a different tag number. Use of the Fast Lane Credit Card is similar to this. The Toll Station computers assign a different tag number to each vehicle that is currently in the Fast Lane. The next time a certain vehicle uses the same Fast Lane, there will probably be, with statistical probability, a different tag number that is assigned to the same vehicle. Or, by chance it may be the same tag number that was assigned the last time the vehicle used the Fast Lane. Occasionally, by statistical chance, the tag number may be the same four-digit number that is the user's password number.

The wallboard zone is long enough so that the user has approximately 15 to 20 seconds to enter the Tag Number into the keyboard. With a push of a button the user can re-enter the PIN or Tag Number if an entry error has been made. For purposes of illustration it will be assumed that the Fast Lane speed limit is 55 miles per hour. However, the Highway Regulatory Council may set some lower speed limit, for example 45 MPH. In the event the motorist fails to enter the tag number, the advanced signal processing operations of the toll collection central processing equipment will automatically adjust for this condition and the toll will still be paid. The same is true if the motorist enters the wrong tag number.

When the tag number is entered, the right wallboard moving display will respond in a manner similar to the TV screen of a bank ATM machine. For example, it would display: HELLO JOHN DOE. The right wallboard also displays other information.

By now the central processing computers of the Toll Station and Finite State Machine are performing a full array of tests, analysis, and processing operations concerning the communications signals which are being received from the Fast Lane Credit Cards in the vehicles in the Fast Lane. Among many other agenda, the computers are simultaneously working in millions of hyperspace vectorspaces, each consisting of millions of dimensions. In addition to this, other processing operations are performed. One of them is an optics system which, independent from the FLCC, is analyzing the vehicle class. For example an 18 wheel tractor trailer pays more toll than a 2 axle family sedan.

Finally the vehicle reaches the Toll Payment Point in the Fast Lane which is next to the Toll Booths of the stop and pay lanes. At this point the toll is paid literally at the speed of light.

The benefits derived from the FLCC are identified as follows:

Saves time which is often the most valuable time of the day, that is the rush hour commute. Time wasted during this period represents time late for work (during morning rush hour) or time lost from family (during evening rush hour).

The Wallboard Display notifies the motorist concerning traffic conditions in the miles ahead and traffic jams to avoid.

The FLCC saves gasoline because the motorist does not slow down, stop, wait for long periods of time with the engine running, then start up again, and accelerate all the way back up to 55 MPH.

The motorist does not have to have money in the car to pay the toll.

The FLCC is particularly valuable during heavy snow storms and blizzards which are a wintertime way of life in major cities on the Northeast coast and Midatlantic regions of the United States.

The Fast Lane Wallboard notifies FLCC users of existing road conditions and closed roads due to snow.

The Fast Lane Wallboard notifies the motorist how long it is currently taking to get to certain points. This is done by measuring, during the last 20 minutes or 40 minutes, how long it took other FLCC vehicles to get from point A to point B (and points C, D, E, . . . )

Family members at home during major snow emergencies can find out if their loved ones have yet crossed the Toll Station. This is done by using the family touch tone telephone and calling the Toll Station computers and using the home telephone keyboard to make inquiries. The computers tell the family member what time the motorist crossed the Toll Station. Note, this service optional/voluntary.

In the future the Wallboard Display will respond to questions from the interactive FLCC keyboard. Note it will be done so that the keyboard offers the "ultimate" in user-friendly qualities. That is, it is extremely simple and easy to use. In fact, easier than a telephone.

Vacationers who are new to the area and are exiting the Turnpike can inquire about "Where is the nearest gas station?" "Where is the nearest brand x gas station?" "Where is a hotel?"

Hotel reservations can be placed. Note this will be done in a manner that is much more simple than how it may appear at first glance. Details will not be given here except that the central computers will have certain information about the consumer's preferences in storage. Note, this is optional/voluntary.

The FLCC is as easy to use as the car radio.

The FLCC is easier to use than conventional stop and pay toll lanes where the consumer must: 1. apply the brakes and come to a controlled stop. 2. roll down the window. 3. reach into his/her pockets for money in a sitting position. 4. reach out and hand the cash to the Toll Booth Agent and be careful not to drop the money or let the wind blow it away. 5. Receive change. 6. Put the change back into his/her pocket in a sitting position. 7. breath the poisonous carbon monoxide fumes that overwhelm the air around conventional stop and pay toll lanes. 8. accelerate the vehicle. 9. roll up the window. 10. jockey into position with respect to all the other accelerating traffic. 11. maneuver into the position of choice among all the other vehicles which are maneuvering for the same spot. 12. come back up to full speed, keeping one eye on the speedometer while doing so. 13. keep one eye on the rear view mirror. 14. keep one eye on his/her wrist watch and decide how late for work he/she will be because of waiting 5 minutes to pay the toll.

The consumer pays his/her toll literally at 186,282 miles per second!

The Fast Lane Credit Card industry will create new jobs. In fact the possibilities are so broad and far ranging that adequate presentation of the pluripotent job and career paths are tens of dB beyond the scope of this document. Examples include roadway construction and maintenance jobs which will be realized when local and state governments finally have necessary and sufficient resources to support the required transportation work; instrument manufacturing jobs; electronic industry jobs; computer jobs; product distribution jobs; product shipping and handling jobs; banking jobs; management jobs; secretarial jobs; product literature and printing jobs; advertising jobs; marketing jobs; customer service jobs; and accounting jobs. These examples are only the tip of the iceberg.

The Turnpike Authority is guaranteed its toll revenue to be deposited electronically into its bank account the very second that the toll payment is made.

A full complement of safeguards and checks and balances exist which make it impossible to steal or embezzle the Turnpike Authority's toll money by the motorist or by personnel associated with the processing computers. An example of one is "vehicle counters" which receive sensor data from sensors placed in pavement similar to the type used for traffic light control and record exactly how many vehicles have traveled in the Fast Lane. Similar concepts, but less obvious are techniques for measuring the vehicles class, i.e., the toll rate the vehicle pays. Secure, redundant, independent system integrity testing means for these purposes are outlined in FIG. 4 and other security measures are addressed elsewhere.

Firetrucks, police, and ambulances can use the Fast Lane to rapidly get through Toll Stations using Government FLCC's. This is not the present situation for the problem areas.

For the first time the Fast Lane Credit Card offers a means of paying for extremely densely used highways. This is desirable over the plan of unfair policies such as paying for major highways with real estate tax, vehicle tax, the county stickers on the windshields of vehicles in certain counties, gasoline tax, sales tax, or even the Federal Government. That is, the only truly fair policy is not to get money for a major highway from people who do not use it. Instead, pay for it according to who uses it. The FLCC makes such an idea possible. Because without it, major highways will be brought to their knees with backed up traffic during rush hour. As indicated previously, there are highways with over 700,000 vehicles during each commute.

Continuing with the previously stated advantage, taxpayers are already faced with an outrageous Federal Deficit. A certain portion of the Federal budget is allocated to local and interstate highway maintenance. But the individual taxpayer does not necessarily enjoy the benefit resulting from his/her tax dollar going to another region of the country. Furthermore, Federal assistance for local roads is becoming increasingly difficult to receive. Fairfax County, Virginia is an example.

The FLCC is going to reduce the gasoline consumed at Toll Stations. This savings proves to be significant over a year's time if all the Toll Stations in the United States are considered. As stated earlier, some of this comes from outside the U.S. and therefore negatively impacts the trade imbalance.

The FLCC is a method of funding existing and future highway development and road improvement plans.

As a result of the new jobs the FLCC creates, the economy benefits.

Turnpike Authority employees who are the human resource collection agents at stop and pay lanes at Toll Stations which also have Fast Lanes, will benefit because of the lower carbon monoxide concentrations in the vicinity. This problem is evidenced by experiencing these toxic fumes while spending an hour or two at stop and pay toll stations and by signs at toll stations such as ones on Route 95 and the New Jersey Turnpike which say: "Buses pull out slowly".

The fuel saved in the Fast Lane reduces the fuel that is imported from foreign sources. Thus, there is a financial benefit to the Federal Government.

Would-be toll evaders are caught at a rate of no less than exactly 100%.

The present invention provides an acceptable cash generating solution for elected politicians who would otherwise be faced with politically unpopular alternatives.

The present invention provides a solution to the immediate problem of Fairfax County, Va. which must procure one billion dollars cash for new road building. To gain a perspective on how much money this really is, consider the following. A one dollar bill measures approximately 15.55 centimeters long. One billion dollars in one dollar bills stacked end to end would create a line of dollar bills round trip from Mount Vernon, Washington State to Disney World, Florida plus another round trip line from Loud's Island, Maine to Bel Air, Calif. Plus three more round trip lines each from the Maine Turnpike Exit 9 to Papeete, Tahiti plus another line of dollar bills more than 46 thousand miles long. The instant invention will procure this cash for Fairfax County and all other local governments that need it. Furthermore, if this cash were collected from conventional stop and pay toll stations, it would take bank money counters, working round the clock, years simply to count it. The amount of time the drivers would spend waiting in line to pay this money at stop and pay stations would be tens upon tens upon countless tens of millions of hours.

Another benefit which the present invention affords is that it enjoys the highest communications integrity that the laws of mathematics and electrical engineering allow. In fact it uses many, many of the unclassified electronic communications principles used by electronic warfare systems. Furthermore, as stated earlier, even if the communications channel is lost, the toll is still paid.

Another benefit is that for the first time in history local and interstate merchants are given the means to provide radio advertising directly to a consumer who specifically seeks out certain special products or merchandize categories. The instant invention provides this through voluntary "commercial mail". Furthermore the marketing staff of these merchants or companies can know, through the toll station computers, how many consumers request information in the various categories.

The present invention provides Inter Vivos Communication through optional personal mail.

The present invention provides community service announcements through optional public service mail.

The present invention provides means at certain parking facilities for quickly finding a place to park.

The present invention circumvents the problem of lost turnpike tickets that may blow out the window. For toll roads which issue tickets for stop and pay traffic, the present invention provides means for interstation communications so that when a vehicle exists the Turnpike, the computers have a real time record of the entrance point. This activity occurs in item 680 of FIG. 6.

The present invention provides consumer friendly solutions to the problems which will face commercial toll road corporations such as The Toll Road Corp. of Va. Such commercial enterprises are not new as indicated in a June 8, 1978 article of the Virginia Reston Times Newspaper which discusses commercial toll road companies in the year 1812.

Another benefit of the present invention is that the motorists who use the fast lane are able to capitalize on their collective purchasing power for common purchasing power for common every day consumer goods. That is, a local retail outlet store can offer a one day price reduction for a household product and reap the benefit of volume sales to fast lane users by exploitation of CCM, or cooperative commercial mail, by the afore mentioned consumer mail means of the present invention. The consumer benefits because she/he saves money in the purchase of every grocery product, certain drug store products, certain department store products, automobile oil changes, etc. Taken to its fullest potential CCM will save more than enough money to pay for the daily toll charge at the toll station. Every day a different daily-used consumer product can be offered. The merchant benefits, the fast lane consumer benefits, and the toll station benefits because certain consumers will find it to their advantage to go out of their way to use the toll road.

The present invention enjoys a multiplicity of safeguards making it 100% immune to computer viruses. These safeguards include means whereby telephone interfaces to the system prevent access by the external phone link into any part of the processing structure including source codes or object codes of the system; the system is not connected to LAN's or other networks; the computer hardware does not recognize standardized operating systems including Berkeley 4.3, Versados, VMS, MVS, RMX, SYS V-RMK, OS-2; and many other immunity protocols published in the open literature.

Another benefit of the present invention is the increased revenue injected into Federal and State Governments in the form of additional income tax base due to the stimulated economy resulting from new jobs created by the instant invention, including the road construction/maintenance jobs.

The instant invention, for the first time ever, provides the fair, viable solution to the transportation funding problem which receives front page publicity day, after day, after day, after day in the Fairfax Journal Newspaper. Typical of the front page lengthy articles is the Apr. 28, 1989 edition which speaks of the Fairfax County Citizens as being "Traumatized" concerning "The Need for New Revenues Sources" for roads in the face of unacceptably high real estate taxes. On top of these unacceptably high real estate taxes, the county surely must procure another $1,000,000,000 for roads. The irony is that many tens of thousands of motorists who use Fairfax County Roads every day, do not live in the County. To any interested observer the hideous rush hour traffic jams may be experienced first hand by a drive on Virginia Routes 66, 495, 50, 236, 395, 28, 95, 7 or any commuter secondary road. The present invention is able to raise whatever cash is necessary for new roads.

It will be apparent to those skilled in the art that various modifications can be made to the toll paying system of the instant invention without departing from the spirit or scope of the toll paying system of the present invention, and all variations and modifications of the toll paying system of the instant invention are included herein, provided they come within the scope of the appended claims and their equivalents.

I claim:

1. A toll paying system for use with a vehicle passing through a fast lane having a toll booth, said toll paying system comprising:
   detection means responsive to detecting the presence of said vehicle for generating a detection signal;
   a wall board responsive to the detection signal for displaying a message including tag information;
   a passenger for reading the tag information;
   a vehicle having a toll instrument including,
      a first processor located in said vehicle for storing identification data and having an input for inputting the tag information read by the passenger in said vehicle from said wall board said first processor including means for inputting a user number;
      a transmitter located in said vehicle and coupled to said first processor and responsive to said passenger initiating said transmitter, for repetitively transmitting on at least two frequencies, a signal having, the tag information, the identification data;
   a toll booth having,
      antenna means having direction finding capability for reducing interference and improving reception of the transmitted signal;
      a receiver located at said tool both and responsive to said transmitter for receiving the transmitted signals having error correction/detection data, the tag information, the identification data, the transaction data, and account data;
      a second processor located at said toll both and coupled to said receiver and said the detection means, and responsive to the transmitted error correction/detection data, the tag information, the identification data, account data, and the class of said vehicle for verifying tag information, said second processor including means for charging a toll fee to an account using the account data; and
      camera means coupled to said second processor and responsive to the transmitted error correction/detection data, the tag information, the identification data, and account data, for photographing a serial number on said toll instrument and vehicle license plates.

2. A toll paying system for use with a vehicle passing through a fast lane having a toll booth, said toll paying system comprising:
   a wall board responsive to the detection signal for displaying a message including tag information;
   a passenger for reading the tag information;
   a vehicle having a toll instrument including,
      a first processor located in said vehicle for storing identification data and having means operated by said passenger for inputting the tag information;
      a transmitter located in said vehicle and coupled to said first processor for transmitting a signal having the identification data;
   a toll booth having,
      a receiver located at said toll booth and responsive to said transmitter for receiving the transmitted signal having identification data; and
      a second processor located at said toll both and coupled to said receiver, and responsive to the identification data, said second processor including means for charging a toll to an account using the identification data.

3. The toll paying system as set forth in claim 2 further including:
   means for generating light beams traversing said fast lane;
   a plurality of light beam detectors responsive to the light beams for determining class of vehicle crossing said light beams and for generating a detection signal having first class data;

class means for determining the class of vehicle passing through said fast lane and generating a class signal having second class data;

a third processor coupled to said second processor, said light beam detectors and said class means, and responsive to the detection signal and the class signal for generating a picture signal; and means coupled to said third processor and responsive to the picture signal for photographing a serial number on said toll instrument and vehicle license plates.

4. A toll paying system for use with a vehicle passing through a fast lane having a toll booth, said toll paying system comprising:

a wall board responsive to a detection signal for displaying a message including tag information;

a passenger for reading the tag information;

a vehicle having a transmitter and means responsive to said passenger entering the tag information for transmitting a signal having identification data and tag information; and a toll booth having a receiver responsive to said transmitter for receiving the transmitted signal having identification data and tag information, and for processing said identification data and tag information.

5. The toll paying system as set forth in claim 4 further including:

a plurality of light beam detectors responsive to the light beams for determining class of vehicle crossing said light beams and for generating a detection signal having first class data;

class means for determining the class of vehicle passing through said fast lane and generating a class signal having second class data;

a third processor coupled to said second processor, said light beam detectors and said class means, and responsive to the detection signal and the class signal for generating a picture signal; and means coupled to said third processor and responsive to the picture signal for photographing a serial number on said toll instrument and vehicle license plates.

6. A method for paying a toll for use with a vehicle passing through a fast lane having a tool booth, comprising the steps of:

inputting the tag information into a first processor located in said vehicle;

transmitting a signal having identification data and the tag information from a transmitter located in said vehicle;

receiving the signal having the identification data and tag information by a receiver located at said tool booth; and charging to a second processor a toll fee to an account using the identification data and tag information.

* * * * *